(12) United States Patent
Pekelny et al.

(10) Patent No.: US 10,607,083 B2
(45) Date of Patent: Mar. 31, 2020

(54) SELECTIVELY ALERTING USERS OF REAL OBJECTS IN A VIRTUAL ENVIRONMENT

(71) Applicant: Microsoft Technology Licensing, LLC, Redmond, WA (US)

(72) Inventors: Yuri Pekelny, Seattle, WA (US); Michael Bleyer, Seattle, WA (US); Michelle Lynn Brook, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/040,518

(22) Filed: Jul. 19, 2018

(65) Prior Publication Data

US 2020/0026922 A1 Jan. 23, 2020

(51) Int. Cl.
| | |
|---|---|
| *G06K 9/00* | (2006.01) |
| *G06T 19/00* | (2011.01) |
| *G06F 3/01* | (2006.01) |
| *G08B 21/02* | (2006.01) |

(52) U.S. Cl.
CPC ........ *G06K 9/00671* (2013.01); *G06T 19/006* (2013.01); *G06F 3/011* (2013.01); *G08B 21/02* (2013.01)

(58) Field of Classification Search
None
See application file for complete search history.

(56) References Cited

U.S. PATENT DOCUMENTS

| | | | |
|---|---|---|---|
| 2011/0144480 A1* | 6/2011 | Lu | A61B 6/12 600/424 |
| 2011/0268316 A1 | 11/2011 | Bronder et al. | |
| 2011/0317871 A1 | 12/2011 | Tossell et al. | |
| 2012/0154557 A1 | 6/2012 | Perez et al. | |
| 2016/0018655 A1* | 1/2016 | Imoto | G06F 3/011 345/8 |

(Continued)

OTHER PUBLICATIONS

Girshick, et al., "Rich feature hierarchies for accurate object detection and semantic segmentation, Tech report (v5)," arXiv:1311.2524v5 [cs.CV], Oct. 22, 2014, 21 pages.

(Continued)

*Primary Examiner* — Ke Xiao
*Assistant Examiner* — Jed-Justin Imperial

(57) ABSTRACT

A computer-implemented technique is described herein for discriminatively apprising the user of the existence of some, but not necessarily all, physical objects in a physical environment in the course of the user's interaction with a virtual environment. In operation, the technique allows the user to selectively identify one or more objects-of-interest, such as people, walls, computing devices, etc. The technique then uses a scene analysis component to automatically detect the presence of the selected objects-of-interest in the physical environment, while the user interacts with the virtual environment. The technique provides alert information which notifies the user of the existence of any objects-of-interest that it detects. By virtue of the above-summarized strategy, the technique can apprise the user of objects-of-interest in the user's vicinity without cluttering the user's virtual experience with extraneous information pertaining to the physical environment.

20 Claims, 12 Drawing Sheets

(56) References Cited

U.S. PATENT DOCUMENTS

2016/0109940 A1     4/2016   Lyren et al.
2017/0357332 A1    12/2017   Balan et al.
2019/0069117 A1*   2/2019   Sahay .................... H04S 7/304

OTHER PUBLICATIONS

Ren, et al., "Faster R-CNN: Towards Real-Time Object Detection with Region Proposal Networks," arXiv:1506.01497v3 [cs.CV], Jan. 6, 2016, 14 pages.

Shotten, et al., "Real-Time Human Pose Recognition in Parts from Single Depth Images," Communications of the ACM, vol. 56, No. 1, Jan. 2013, 9 pages.

"HTC Vive," available at <<https://en.wikipedia.org/wiki/HTC_Vive>>, Wikipedia article, accessed on Jul. 3, 2018, 7 pages.

"Steam (software)," available at <<https://en.wikipedia.org/wiki/Steam_(software)>>, Wikipedia article, accessed on Jul. 3, 2018, 42 pages.

Durrant-Whyte, et al., "Simultaneous Localisation and Mapping (SLAM): Part I," in IEEE Robotics & Automation Magazine, vol. 13, No. 2, Jun. 2006, 10 pages.

Bailey, et al., "Simultaneous Localization and Mapping (SLAM): Part II," in IEEE Robotics & Automation Magazine, vol. 13, No. 3, Sep. 2006, 10 pages.

Search Report and Written Opinion in PCT/US2019/039637, dated Oct. 28, 2019, 16 pages.

* cited by examiner

OVERVIEW OF OPERATION OF THE SELECTIVE PRESENTATION COMPONENT
1402

RECEIVE OBJECT-SELECTION INFORMATION, IN RESPONSE TO INTERACTION BY THE USER WITH AN INPUT DEVICE, AND/OR IN RESPONSE TO PRECONFIGURED SETTING INFORMATION. THE OBJECT-SELECTION INFORMATION SPECIFIES ONE OR MORE OBJECTS-OF-INTEREST. OPTIONALLY, ALSO RECEIVE ALERT-CONDITION INFORMATION AND/OR ALERT-MODE INFORMATION, ETC.
1404

RECEIVE IMAGE INFORMATION THAT REPRESENTS THE PHYSICAL ENVIRONMENT FROM AT LEAST ONE ENVIRONMENT-SENSING DEVICE, THE PHYSICAL ENVIRONMENT CORRESPONDING TO A PHYSICAL SETTING IN WHICH THE USER USES A VIRTUAL REALITY DEVICE TO INTERACT WITH A VIRTUAL ENVIRONMENT
1406

ANALYZE THE IMAGE INFORMATION USING A SCENE ANALYSIS COMPONENT TO DETERMINE WHETHER ANY OF THE OBJECTS-OF-INTEREST ARE PRESENT IN THE PHYSICAL ENVIRONMENT AT A CURRENT TIME, THE ANALYZING OPERATION PRODUCING OUTPUT INFORMATION WHICH IDENTIFIES AT LEAST ONE DETECTED OBJECT
1408

GENERATE ALERT INFORMATION THAT IDENTIFIES PRESENCE OF THE DETECTED OBJECT(S)
1410

PRESENT THE ALERT INFORMATION TO AN OUTPUT DEVICE OF THE VIRTUAL REALITY DEVICE WHILE THE USER INTERACTS WITH THE VIRTUAL ENVIRONMENT PROVIDED BY THE VIRTUAL REALITY DEVICE, THE ALERT INFORMATION APPRISING THE USER OF SOME OBJECTS IN THE PHYSICAL ENVIRONMENT AT THE CURRENT TIME, BUT NOT ALL OF THE OBJECTS IN THE PHYSICAL ENVIRONMENT
1412

FIG. 14

SELECTIVELY ALERTING USERS OF REAL OBJECTS IN A VIRTUAL ENVIRONMENT

BACKGROUND

A head-mounted display (HMD) may present an immersive virtual environment to a user that may entirely or partially occlude the user's view of the physical environment in which he or she operates. For some HMDs, the user's lack of awareness of the physical environment can pose safety hazards. It may further complicate the user's interaction with the physical environment. Several solutions have been proposed to address these issues. In one solution, the user may simply periodically remove the HMD device to look at the physical environment. In another solution, the HMD displays prominent edges found in the complete physical environment that is visible to the HMD's video cameras. Another solution gives the user the opportunity to toggle back and forth between a view of the complete physical environment and the virtual environment. Another solution uses a picture-in-picture strategy to show information regarding the complete physical environment, set within the virtual environment.

SUMMARY

A computer-implemented technique is described herein for discriminatively apprising the user of the existence of some, but not necessarily all, physical objects in a physical environment, in the course of the user's interaction with a virtual environment. In operation, the technique allows the user to selectively identify one or more objects-of-interest, such as people, walls, computing devices, etc. Alternatively, or in addition, the technique can detect one or more objects-of-interest based on preconfigured setting information. The technique then uses a scene analysis component to automatically detect the presence of identified objects-of-interest in the physical environment, while the user interacts with the virtual environment. The technique then provides alert information which notifies the user of the existence of any objects-of-interest that it detects.

By virtue of the above-summarized strategy, the technique can apprise the user of objects-of-interest in the user's vicinity without cluttering the user's virtual experience with extraneous information pertaining to the entire physical environment. For example, the technique can alert the user to the existence of other people in the user's vicinity, but not stationary kitchen appliances, etc. Or the technique can alert the user to the existence of some people, but not other people. This behavior is desirable because it reduces interference by the alert information with the virtual environment. The technique also does not require the user to take the virtual reality device off or manually switch to a different viewing mode. The technique also enhances the effectiveness of its alerts, e.g., by not distracting the user with alert information regarding objects that are of little interest to the user.

According to another illustrative aspect, the technique allows the user to choose the conditions under which alert information is provided to the user. For example, a user may opt to receive alert information regarding a person's presence when the user is within 3 meters of that other person.

According to another illustrative aspect, the technique allows the user to choose the form of the alert information that is delivered to the user. For example, a user may opt to receive alert information as pass-through video, a reconstructed surface, proxy virtual content (such as an avatar), a textual label, a spoken message, etc. Proxy virtual content corresponds to any information presented in a virtual environment that is used to depict a physical object in the physical environment, but where that information represents some modification to the actual appearance of the physical object.

According to another illustrative aspect, the scene analysis component uses one or more machine-trained object detection components to detect the presence of objects-of-interest in the physical environment.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 14 is a flowchart that shows one illustrative manner of operation of the SPC of FIG. 7.

Figure 1:
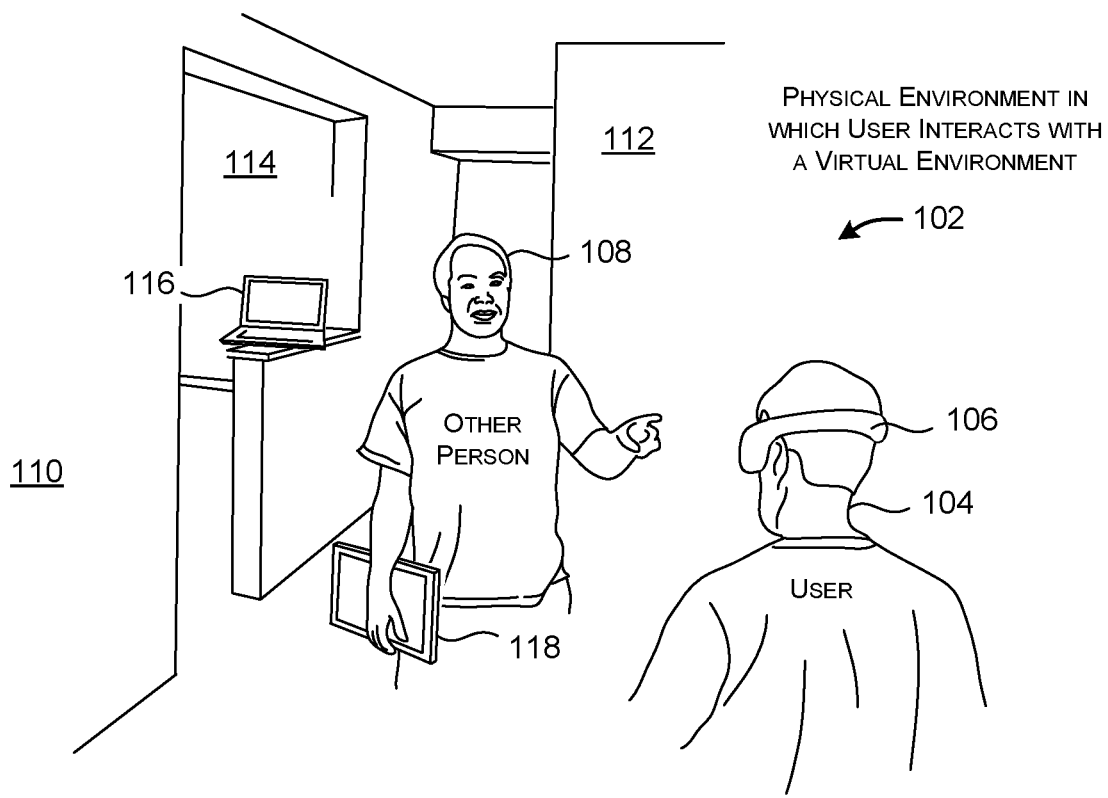
FIG. 1 shows an illustrative physical environment in which a user interacts with a virtual environment using a virtual reality (VR) device.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a virtual reality device for selectively apprising a user of the existence of physical objects in the user's vicinity as the user interacts with a virtual world. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component" refers to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Virtual Reality Device

A.1. Illustrative User Experience

FIG. 1 shows a physical environment 102 in which a user 104 uses a virtual reality (VR) device 106 to interact with a virtual reality environment ("virtual environment"). The physical environment 102 corresponds to an indoor space that includes a plurality of objects. In this merely illustrative case, the objects include: another person 108, a plurality of walls (110, 112, 114), and two computing devices (116, 118).

The VR device 106 in the example of FIG. 1 corresponds to a head-mounted display (HMD). In one implementation, the VR device 106 produces a completely immersive virtual environment. In such an environment, the user 104, while he wears the VR device 106, cannot see the physical environment 102. The technique described herein is most useful in the context of such a fully immersive virtual world. But the term VR device 106 is used broadly herein, and encompasses devices that allow a user 104 to see, to some extent, physical objects in the physical environment while the user 104 interacts with the virtual environment. For instance, the VR device 106 can achieve this effect using a see-through display device or the like. In the context of a see-through display device or the like, the technique described herein helps to highlight the presence of a physical object that might be already visible to the user 104 to some extent, such as by placing a glowing aura around that object. However, to facilitate explanation, the following description will assume the case in which the VR device 106 provides a completely immersive virtual experience that entirely occludes the user's view of the physical environment 102.

Further, while FIG. 1 shows that the VR device 106 corresponds to an HMD, the principles described herein can be applied to other types of VR devices. For example, the VR device 106 can alternatively correspond to a computing device of any type which presents a virtual environment on one or more external display devices not affixed to the user's head, but where those external display device(s) at least partially block the user's view of the physical environment 102. Further, while FIG. 1 shows the use of the VR device 106 in an indoor environment, the principles described herein can be applied to any environment (including outdoor environments mixed indoor/outdoor environments, etc.), as well as environments having any geographic scope.

Figure 2:
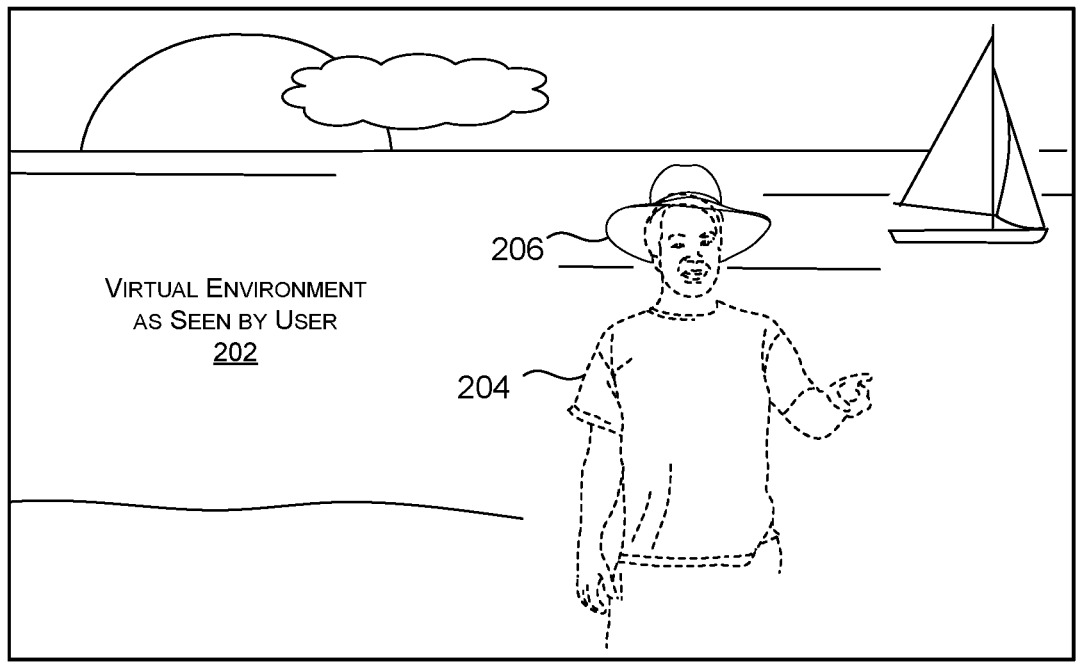
FIG. 2 shows an illustrative virtual environment visible to the user within the physical environment of FIG. 1. The VR device shows alert information which apprises the user of the existence of a person in the vicinity of the user at the current time, within the physical environment.

FIG. 2 shows a virtual environment 202 as seen by the user 104 through the VR device 106. In this merely illustrative case, the virtual environment 202 corresponds to a simulated beach scene within which the user 104 may virtually explore, etc. In other cases, the virtual environment 202 can include a game environment of any type, an educational or simulation environment of any type, etc.

Broadly, the VR device 106 includes a selective presentation component (SPC) that performs three main functions. First, the SPC solicits input from the user 104 regarding a set of objects-of-interest. These objects correspond to physical objects that the user 104 wishes to be notified of when they appear in the physical environment 102, while the user 104 is interacting with the virtual environment 202. The user 104 can specify an object with any level of detail. For instance, the user 104 may identify all people as objects-of-interest, just members of his own family, or just a specific person, etc. Alternatively, or in addition, the SPC may identify one or more objects-of-interest based on preconfigured setting information (that is created by some entity other than the user 104). Second, the SPC uses automated analysis to determine whether any of the identified objects are present in the physical environment 102 while the user 104 interacts with a virtual world provided by the VR device 106. Any object-of-interest that the SPC detects is referred to herein as a detected object. Third, the SPC provides alert information to the user 104 which alerts the user 104 to each detected object. For instance, the SPC may present the alert information as visual information that is overlaid on the virtual environment 202.

In the case of FIG. 2, assume that the user 104 has previously indicated that he wishes to be alerted to the existence of other people in the physical environment 102 when the user 104 is immersed in the virtual environment 202. This makes the presence of any person other than the user 104 an object-of-interest. In the scenario of FIG. 1, the physical environment 102 does in fact include a person 108 in front of the user 104. The SPC detects this person 108 and then presents alert information 204 which notifies the user 104 of the existence of the other person 108. In this case, the alert information 204 may include a visual representation of the surface of the other person's body. Without limitation, in one example, the SPC can generate this kind of alert information using any three-dimensional reconstruction algorithm (e.g., the marching cubes algorithm) based on depth sensor readings provided by the VR device 106.

In one implementation, the alert information 204 that the SPC displays is a direct representation of the appearance of the other person 108. In another implementation, the SPC can display alert information that includes at least some proxy virtual content. Proxy virtual content corresponds to any information presented in the virtual environment 202 that is used to depict a physical object in the physical environment 102, but where that information represents some modification to the actual appearance of the physical object.

In one case, the SPC can present proxy virtual content that entirely replaces a direct representation of a physical object in in the physical environment 102. For example, the SPC can replace a direct representation of the other person 108 with a simplified avatar (such as a skeleton representation of the other person 108 in his current pose), a fanciful avatar (such as a gladiator, wizard, a cartoon figure, etc.), or even a representation of another actual person. The SPC can perform the same operation with respect to any physical object, e.g., by replacing a representation of an actual chair with another chair having a different style, a representation of an actual pet (e.g., a cat) with another kind of animal (e.g., a leopard), and so on.

Alternatively, or in addition, the SPC may present proxy virtual content which only supplements a direct representation of the other person 108. For example, the SPC can place a virtual hat 206 on the head of the other person 108 or a virtual lei around his neck (not shown). This virtual hat 206 constitutes virtual content because the actual person 108 is not wearing a hat. Or the SPC can replace a detected image associated with the surface of a physical object with a new image, essentially pasting the new image onto a representation of the surface of the physical object. For instance, the SPC can use this effect to change the actual color of the person's shirt to another color. Likewise, the SPC can change an actual single-color interior wall to a cliff face or a wall having a brick veneer. In another example, the SPC can display a virtual object next to the detected object, such as by showing a strobing exclamation point that appears to float in the air in close proximity to any representation of the other person 108.

The SPC can present proxy virtual content based on several factors described below. According to one factor, the SPC can modify the appearance of a physical object so that it complements the virtual environment 202. Overall, this has the effect of reducing interference with the virtual environment 202, while still providing a mechanism that enables the user 104 to interact with the physical environment 102. For example, assume that the virtual environment depicts a forest scene. The SPC can transform an actual chair into a tree stump. The stump continues to serves the intended purpose of alerting the user 104 to an obstacle in his or her path; the stump may further alert the user 104 to the presence of an object on which he or she may sit. But the stump complements the forest scene, whereas a chair would not. The SPC optionally displays virtual objects that have real-object counterparts in a special manner (e.g., with a glowing aura, etc.) to distinguish these objects from other parts of the virtual environment 202 (that do not have real-object counterparts). The SPC can apply the same processing described above to present proxy virtual content that only supplements a direct representation of a real object. For example, the SPC can add the virtual hat 206 to the person's head in FIG. 2 because the virtual environment 202 pertains to a beach scene in which people often wear sun hats.

Figure 3:
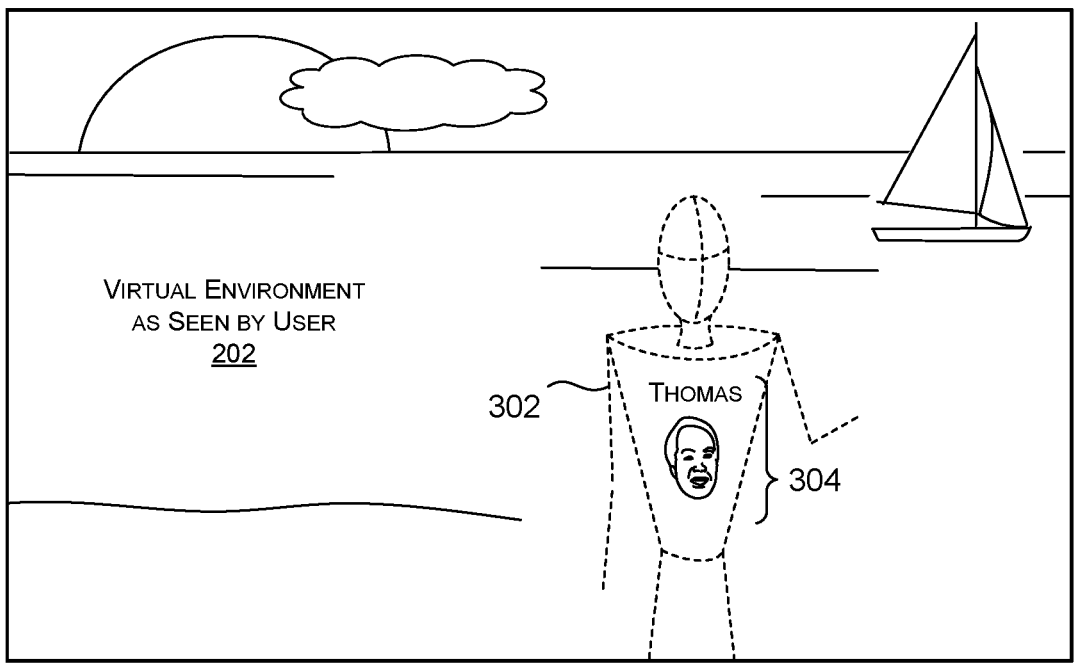
FIG. 3 shows a case in which the VR device uses proxy virtual content to apprise the user of the existence of the person. Here, the proxy virtual content corresponds to a simplified avatar that is presented in place of a direct representation of the person.

FIG. 3 shows an example in which the SPC presents alert information 302 that entirely replaces a direct representation of the other person 108 with proxy virtual content. In this case, the proxy virtual content corresponds to a simplified avatar associated with that other person. The SPC again presents the alert information 302 by overlaying it on top of the virtual environment 202 at an appropriate position, based on the actual position of the other person 108 in the physical environment 108. In addition, or alternatively, the SPC can recognize the identity of the other person 108, e.g., using face recognition technology or the like. The SPC can then present additional alert information 304 in the virtual environment 202 which identifies the person 108, e.g., by presenting the name of that other person 108, and/or by displaying a pre-stored picture or icon associated with that other person 108.

Figure 4:
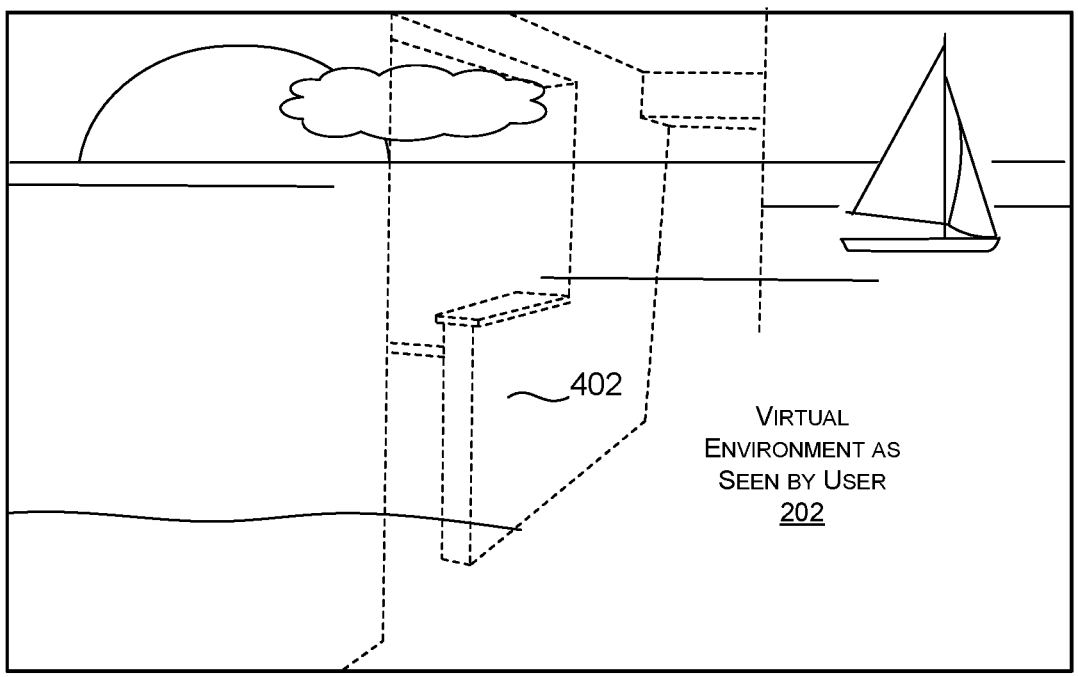
FIG. 4 shows a case in which the VR device provides alert information which apprises the user of the existence of walls in the user's vicinity within the physical environment of FIG. 1.

In the case of FIG. 4, assume that the user 104 has alternatively specified that walls correspond to objects-of-interest. Based on this configuration, the SPC presents alert information 402 which identifies the presence and location of the walls (110, 112, 114) in the physical environment 102. Identifying obstacles, such as walls, is useful information for the user 106 when he is moving, as it helps him to avoid obstacles.

Figure 5:
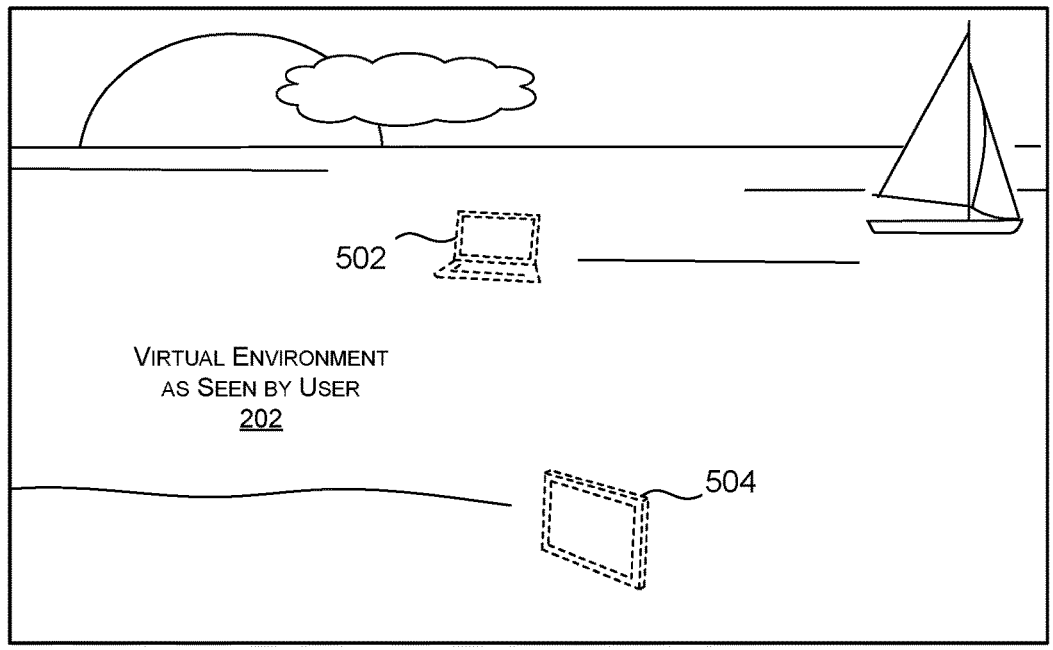
FIG. 5 shows a case in which the VR device provides alert information which apprises the user of the existence of computing devices in the user's vicinity within the physical environment.

In FIG. 5, assume that the user 104 has alternatively specified that computing devices correspond to objects-of-interest. Based on this configuration, the SPC presents alert information (502, 504) that respectively identifies the location of the two computing devices (116, 118) in the physical environment 102.

Note that FIGS. 2-5 correspond to examples in which the user 104 has only designated one kind of object-of-interest, e.g., by choosing people in FIGS. 2 and 3, walls in FIG. 4, and computing devices in FIG. 5. But the user 104 may alternatively choose two or more kinds of objects-of-interest, e.g., by requesting alert information for both walls and people. Further, as will be described below in Subsection A.2, the user 104 can specify the conditions or circumstance in which the SPC generates alert information. For instance, the user 104 can instruct the SPC to only present the alert information for a person when the user 104 is within 2 meters of that person.

Figure 6:
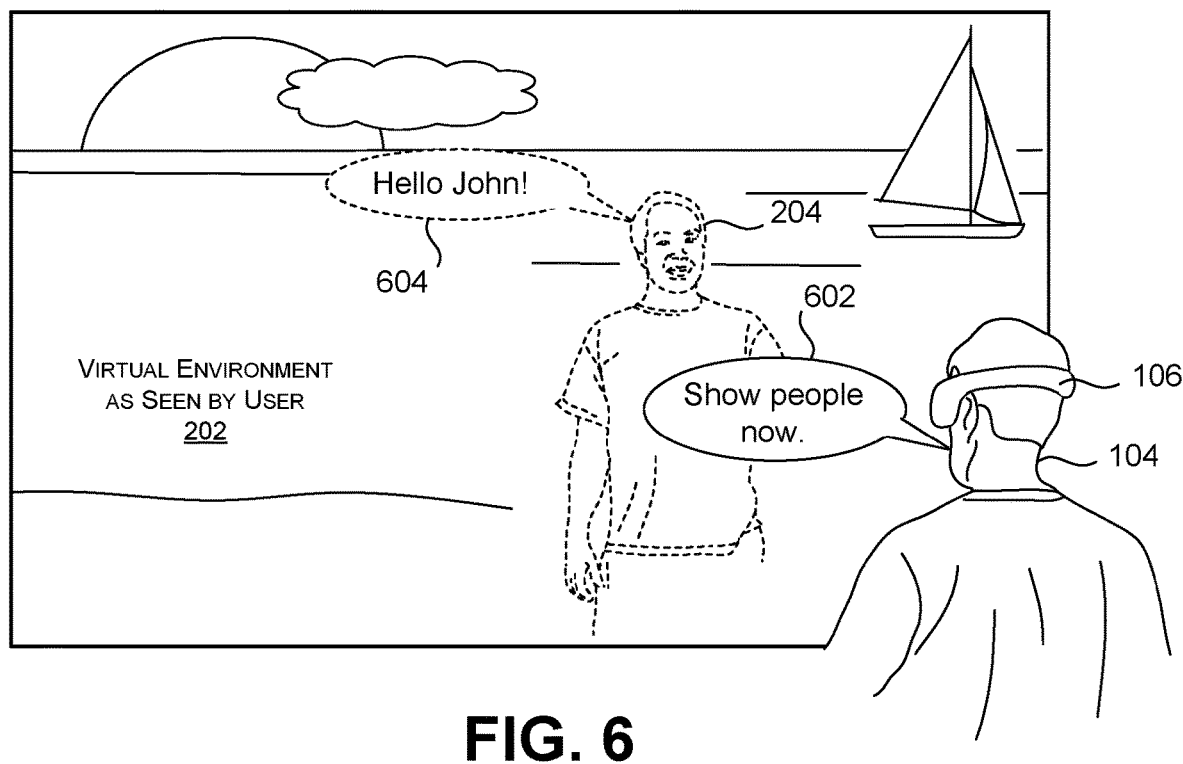
FIG. 6 shows a case in which the VR device provides alert information which identifies the presence of a person, but only when the user (or the other person) makes a real-time command that triggers the presentation of the alert information to the user.

FIG. 6 shows a variation of the example of FIG. 2. In this case, the user 104 configures the SPC to indicate that the alert information 204 should be displayed only when the user 104 provides a command to receive such alert information 204 while the user 104 is interacting with the virtual environment 202. For example, the user 104 may hear other people talking in his vicinity while interacting with the virtual environment 202. In response, the user 104 may issue the command, "Show people now," as represented in FIG. 6 by the voice bubble 602. In response to this command, the SPC will show the alert information 204 that identifies the location of the other person 108, presuming the other person 108 has been detected by the SPC.

Alternatively, or in addition, the SPC may display the alert information 204 when the other person 108 issues a command "Hello John!" (presuming that the user's name is John), or "See me!" or the like, as represented by the voice bubble 604. For instance, assume that the user's friend wishes to get the user's attention as the user 104 plays a game. The friend may provide a voice command that requests the SPC to provide alert information to the user 104, notifying the user 104 of the friend's location. In one implementation, the SPC can allow each user to configure the SPC to associate different commands by the user and/or another person with respective actions.

More generally, FIG. 6 shows two examples of dynamic conditions that might trigger the presentation of alert information. In other cases, the user 104 can configure the SPC to show alert information in response to other kinds of actions performed by (or events associated with) the user 104, and/or in response to other kinds of actions performed by an object in the physical environment 104. For example, the user 104 can configure the SPC to only show alert information associated with walls when the user 104 is walking through the physical environment 102. In another case, the user 104 can configure the SPC to show alert information for other people only when those people are walking through the physical environment 102, and so on.

In another example, the SPC can display alert information which depends on the manner in which the user is currently using one or more handheld (or body-worn) controllers. For example, assume that the user is currently manipulating a handheld controller to simulate the swinging of a bat or tennis racket in the course of interacting with an immersive virtual game. The SPC can display alert information which depends on any combination of: the type of the controller that the user 104 is currently handling; the current position and/or orientation of the controller in the physical environment 102 (which can be detected by optical and/or magnetic signals emitted by the controller); the current movement of the controller (which can be detected by inertial sensors associated with the controller); the proximity of the controller to physical objects in the physical environment 102; the current virtual environment with which the user is interacting, and so on. The user may find the above-described alert information useful to avoid striking a physical object with the controller.

In yet another case, the SPC can display alert information to the user 104 in a manner which depends on the current state of an object-of-interest. For example, the user 104 can configure the SPC to show alert information for a door only when that door is closed.

Further note that the examples of FIGS. 2-6 present a scenario in which the SPC presents alert information in visual form, e.g., by displaying alert information as an overlay onto a visual representation of the virtual environment 202. But alternatively, or in addition, the SPC can present alert information to a user 104 in audio form, haptic feedback form (e.g., vibration, pressure, etc.), and so on. In yet another case, the SPC can display output information via a controller (or controllers) that the user is currently using to interact with a virtual environment, e.g., by using the controller(s) to emit sounds, vibrate, etc.

As yet another variation, in the examples presented above, the assumption is that the user 104 and/or some other entity has configured the SPC in advance of interacting with the virtual environment 202. Alternatively, or in addition, the user 104 may also issue commands to the SPC while he or she is interacting with the virtual environment 202, e.g., by instructing it to start looking for specific objects, stop looking for certain objects, change the conditions under which alert information is provided, change the way in which alert information is provided, and so on. For instance, the user 104 may issue a voice command, "Show floor now," or "Switch alert mode to text only," etc. The SPC can interpret the user's commands using virtual assistant technology and make appropriate changes to its operation.

In conclusion to Subsection A.1, the SPC can apprise the user of objects-of-interest in the user's vicinity without cluttering the user's virtual experience with extraneous information pertaining to the entire physical environment 102. This behavior is desirable because it reduces interference by the alert information with the virtual environment 202. The SPC also does not require the user to take the virtual reality device 106 off or manually switch to a different viewing mode. The SPC also enhances the effectiveness of its alerts, e.g., by not distracting the user with alert information regarding objects that are of little interest to the user. Overall, the SPC improves the user's safety while using the VR device 106, and also facilitates the ability of the user 104 to interact with the objects-of-interest while using the VR device 106.

A.2. Illustrative Selective Presentation Component (SPC)

Figure 7:
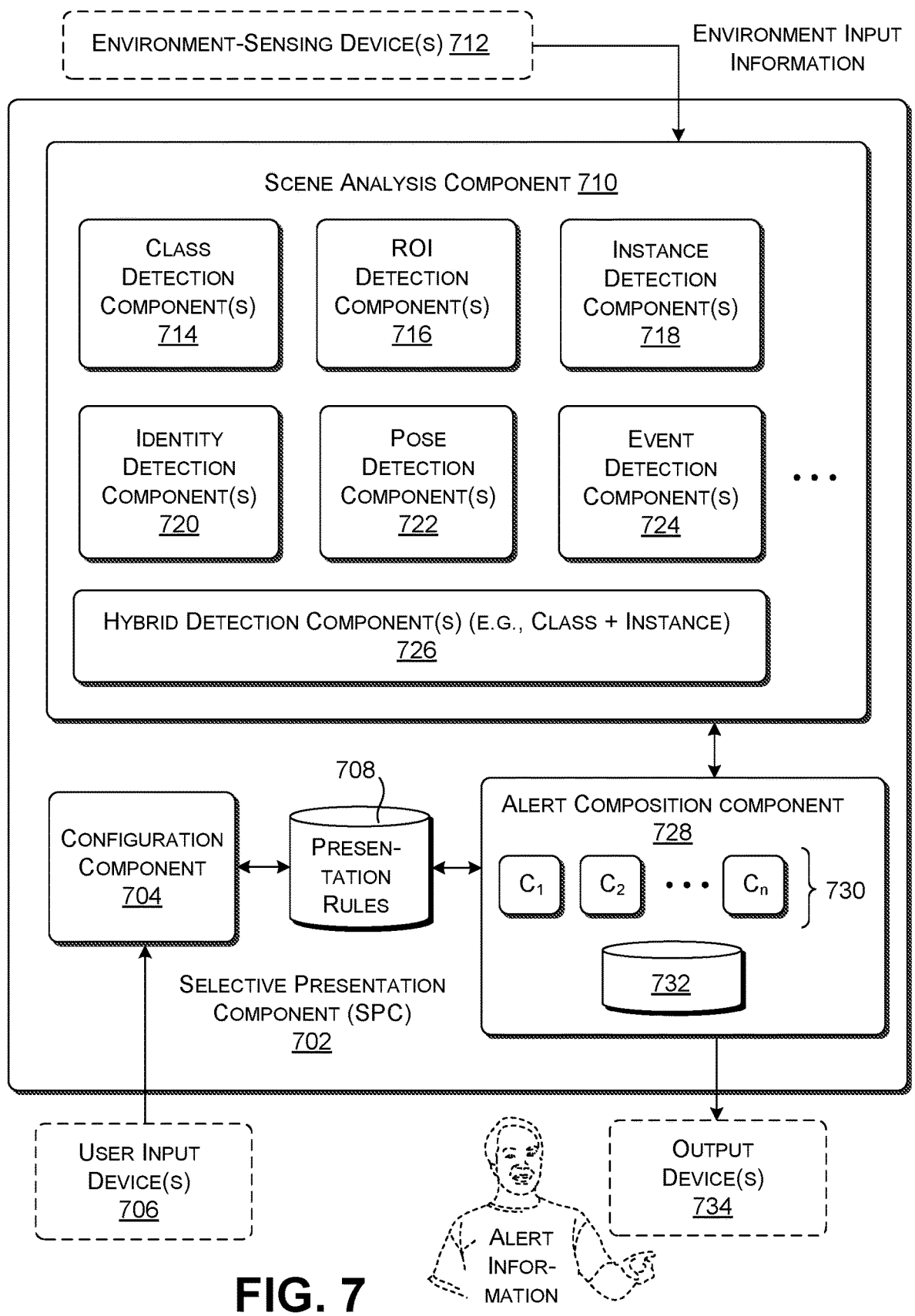
FIG. 7 shows one illustrative implementation of a selective presentation component (SPC) for use in generating and displaying the alert information shown in FIGS. 2-6.

FIG. 7 shows one implementation of a selective presentation component (SPC) 702, which implements the behavior described in Subsection A.1. The SPC includes a configuration component 704 for soliciting user input information from the user 104, which will subsequently control the behavior of the SPC 702. In one implementation, the configuration component 704 receives user input information by presenting one or more graphical user interface (UI) presentations. For instance, the configuration component 704 can present the graphical UI presentation(s) on a display device provided by the VR device 106. The user 104 may interact with the graphical UI presentations using hand gestures, voice commands, handheld controller manipulations, etc.

In another case, the configuration component 704 may correspond to software running on a computing device that is separate from the VR device 106, such as a separate desktop computing device or a smartphone, etc. Here, the configuration component 704 can use a display device connected to the separate computing device to present the graphical UI presentation(s). The separate computing device can then transfer the user input information that it collects to the VR device 106.

Alternatively, or in addition, the configuration component 704 can solicit user input information from the user 104 using a virtual assistant or like interface technology, such as the CORTANA interface provided by MICROSOFT CORPORATION of Redmond, Wash. For example, the configuration component 704 can include a voice synthesizer which asks the user 104 to submit user input information through a series of spoken prompts. The user 104 may respond to these prompts in spoken form.

The user 104 may interact with the configuration component 704 using one or more input devices 706. The input devices 706 can include any of a mouse device, a key entry device, one or more controllers, voice recognition technology, gesture recognition technology, etc. The voice recognition technology and gesture recognition technology can use any techniques to identify voice commands and gestures, respectively, such as, without limitation, Hidden Markov Models (HMMs), deep neural networks, etc.

The configuration component 704 can store the user input information that it collects in a data store 708. The user input information can, without limitation include: object-selection information which identifies the object(s)-of-interest that the user 104 wishes to detect in the physical environment 102; alert-condition information which specifies at least one condition in which the alert information is to be provided to the user 104; and alert-mode information that specifies a manner in which the alert information is to be presented to the user 104. For example, the user 104 can supply: object-selection information that indicates that he is interested in detecting people in the physical environment; alert-condition information that specifies that he wishes to be notified when he is within 3 meters of another person; and alert-mode information that specifies that he wishes the alert information to be formulated as pass-through video information.

In another mode of operation, the configuration component 704 can receive real-time commands from the user 104 while the user 104 is interacting with the virtual environment 202. The commands may instruct the configuration component 704 to make changes to any of the above-described object-selection information, alert-condition information, and/or alert-mode information.

Alternatively, or in addition, the data store 708 can include preconfigured input information that specifies default object-selection information, alert-condition information, and/or alert-mode information, etc. For instance, the VR device 106 may be preconfigured to detect walls in the physical environment 106 at a distance of 2 meters from the user 104, and then display alert information which represents the walls using pass-through video. In some implementations, the SPC 702 can allow the user to change any default setting using the configuration component 704. As used herein, a selected object may refer to an object-of-interest explicitly selected by a user or by preconfigured setting information.

A scene analysis component 710 receives and analyzes environment input information from at least one environment-sensing device 712. The environment-sensing device(s) 712 can include: one or more video cameras (e.g., one or more gray-scale video cameras, one or more color video cameras, etc., or any combination thereof); one or more depth camera systems; one or more microphones, etc. A depth camera system provides, at each moment, a depth image that reflects the distances between different points in the physical environment 102 and a reference point (typically associated with the location of the VR device 106 itself). The depth camera system can use any technique to perform this task, such as a time-of-flight technique, a structured light technique, a stereoscopic technique, etc., or any combination thereof. A time-of-flight technique and a structured light technique use an illumination source to irradiate the physical environment 102. That is, in one time-of-flight technique, the depth camera system may determine the distance between a surface point of interest in the physical environment 102 and the reference point by determining the interval of time between the emission of a pulse of light by the illumination source and the detection of light that is reflected from the surface point. In one structured light technique, the depth camera system may project a pattern of light (e.g., a random speckle pattern, a stripe pattern, etc.) onto the physical environment 102 and detect the manner in which the shapes in the physical environment 102 have distorted the pattern. The depth camera system can use any kind of detector to receive the light, such as a Complementary Metal-Oxide Semiconductor (CMOS) sensor, a Charge-Coupled Devices (CCD) sensor, etc. Although not shown in FIG. 7, the scene analysis component 710 can also receive control input information from one or more controllers with which the user is currently interacting.

In an inside-out implementation, the VR device 106 provides all of the environment-sensing device(s) 712. For example, the environment-sensing device(s) 712 can include plural video cameras integrated with the HMD, a depth camera system integrated with the HMD, etc. In another implementation, at least one environment-sensing device may be provided that is separate from the VR device 106. For example, one or more environment-sensing devices may correspond to stationary devices provided at fixed positions in a room in which the user 104 moves.

The scene analysis component 710 can include one or more object detection components. Without limitation, the object detection components can include: one or more class detection components 714 that detect one or more classes of objects in the physical environment 102 (e.g., by discriminating between walls and people in a scene); one or more region-of-interest (ROI) detection components 716 that detect bounding boxes associated with objects in the physical environment 102; one or more instance detection components 718 that discriminate among objects of the same class (e.g., by discriminating between different people in a scene); one or more identity detection components 720 that detect the presence of specific instances in a scene (e.g., by identifying the presence of specific people in a scene); one or more pose detection components 722 that determine a current pose of a person or other object in the physical environment 102; one or more dynamic event detection components 724 that determine whether a prescribed event has taken place in the physical environment 102 (e.g., corresponding to telltale movement of an object-of-interest, or the user 104 himself, etc.), and so on. The object detection components can also include one or more hybrid detection components 726 that perform two or more of the functions described above. For instance, one kind of hybrid detection component can discriminate between classes as well as instances, thus performing the functions of the class detection component(s) 714 and the instance detection component(s) 718. Any object detection component can operate on any combination of environment input information, such as video information provided by one or more video cameras, depth image information provided by one or more depth camera systems, audio information provided by one or more microphones, movement readings provided by one or more inertial measurement units, etc. Additional information regarding illustrative implementations of the object detection components will be described below in the next subsection.

An alert composition component 728 can generate alert information for each object-of-interest that is detected in the physical environment 102, referred to herein as a detected object. The alert composition component 728 can present the alert information using one or more construction components 730. The alert-mode information specifies the construction component(s) that should be used to present each detected object. Note that different construction components may use the results of different object detection components. Hence, the SPC 702 will selectively invoke the appropriate construction component(s) based, in part, on the alert-mode information that is stored in the data store 708. Any construction component can rely on information stored in a data store 732 to perform its tasks. For example, the data store 732 may store information that is used to generate an avatar or other kind of proxy virtual content, which serves as a proxy for a person's (or other object's) presence in the physical environment 102.

The following description sets forth an illustrative and non-limiting set of construction component components 730 that may be used by the scene analysis component 710.

A video pass-through construction component can use any combination of the object detection components to identify an object-of-interest in the physical environment 102. The video pass-through construction component can then determine the location at which the object-of-interest occurs in the physical environment 102 with respect to the user's current position. The video pass-through construction component can make this determination based on depth information provided by a depth camera system. Or the video pass-through construction component can determine the location of the object-of-interest based on image information provided by the VR device's video cameras, e.g., using the principle of triangulation. The video pass-through construction component can then project the parts of the captured video information captured by the VR device's video camera(s) that pertain to the object-of-interest at an appropriate location in the virtual environment 202, representing the determined location of the object-of-interest. In a variant of this approach, the video pass-through construction component can rely on the ROI detection component(s) to identify the region-of-interest (ROI) associated with the object-of-interest. The video pass-through construction component can then selectively present the video information pertaining to the entire ROI.

An outline-presentation construction component can perform the same functions as the video pass-through construction component. But the outline-presentation construction component additionally uses an edge detection operator (e.g., a Sobel operator) to detect edges in the video information associated with the object-of-interest. The outline-presentation construction component can then present a version of the video information that accentuates the edges of the video information and deemphasizes the remainder of the video information.

A point cloud construction component can perform the same object detection and object location operations described above. But instead of, or in addition to, presenting video information, the point cloud construction component identifies depth image information associated with the object-of-interest, as provided by the VR device's depth camera system. The point cloud construction component then displays a visual representation of the values associated with the depth image information at an appropriate location in the virtual environment 202. The depth image information appears as a point cloud that describes the object-of-interest overlaid at the appropriate location on the virtual environment 202.

A reconstructed surface construction component also accesses the depth image information pertaining to the object-of-interest, as provided by the VR device's depth camera system. The reconstructed surface construction component then uses any surface reconstruction technique (such as the marching cubes technique) to represent the surface of the object-of-interest using a mesh of geometric primitives (such as triangles). It then displays the reconstructed surface at the appropriate location in the virtual environment 202. The reconstructed surface construction component can optionally project video information captured by the VR device's video camera(s), that pertains to the object-of-interest, onto the reconstructed surface.

A label-providing construction component can perform the same object detection and object location operations described above. This construction component differs from the previous construction components by retrieving a text label, icon, or other identifier from the data store 732 that has been associated, in advance, with the object-of-interest that has been detected. The label-providing construction component then displays the text label, icon, or other identifier at the appropriate location in the virtual environment 202.

A proxy-providing construction component performs the same object detection and object location operations described above. This construction component differs from the previous construction components by retrieving proxy virtual content that has been associated, in advance, with the object-of-interest that has been detected. The proxy-providing construction component then displays the proxy virtual content at the appropriate location in the virtual environment 202. As explained above, in some cases, the proxy-providing construction component can display a virtual object (such as an avatar of any complexity) that entirely replaces a direct representation of the counterpart physical object. Alternatively, or in addition the proxy-providing construction component can display virtual content which supplements a direct representation of a counterpart physical object, e.g., by placing the virtual hat 206 on the head of a direct representation of the person 108.

The data store 732 may store the virtual content that may be injected into the scene. The data store 732 may also store trigger information that describes the circumstances in which the proxy-providing construction component will present a piece of virtual content. The proxy-providing construction component can store this trigger information in any form, such as a series of rules, a lookup table, etc. Contextual factors that may play a part in determining what virtual content is displayed include: the identity of a detected physical object; the current state of the physical object; the current state of the user 104; the virtual environment 202 that the user is currently interacting with; the amount of alert information that is currently being displayed; the user's stored preferences, and so on. The data store 732 may also store rules which specify how each piece of virtual content is to be placed in a scene, e.g., by specifying that the virtual hat 208 is to be placed on a top of the person's head, assuming that the object-detection components can detect the person's head.

In a variation of the above-described approach, the proxy-providing construction component can consult the identity protection component(s) 720 to determine the specific identity of a person. The proxy-providing construction component can then annotate proxy virtual content (e.g., an avatar) with personal information, such as the name of a specific person, and/or a thumbnail image of the person's face, etc. In addition, or alternatively, the proxy-providing construction component can consult the pose detection component(s) 722 to determine the pose of the person. The proxy-providing construction component can then manipulate the avatar such that it mimics the pose of the person. Or the proxy-providing construction component can display a skeleton as the avatar itself, as provided by the pose detection component(s) 722. While the proxy-providing construction component has been described in the context of the generation of an avatar, it can perform the same functions to display proxy virtual content associated with any physical object, such as a wall, a pet, etc.

An audio construction component performs the same functions as the label-providing construction component. But instead of providing visual alert information, the audio construction component provides audio alert information, e.g., by providing the message, "Thomas has entered the room and is three meters in front of you." Or the alert information may correspond to the message, "Caution, you are within two meters of a step-down in the floor," etc. Alternatively, or in addition, the audio construction component can display non-verbal sounds, such a single beep or a sequence of beeps. In the latter case, the audio construction component can increase the frequency and/or volume of beeps as the user 104 draws nearer to the object under consideration. Moreover, the audio construction component can use known spatial audio technology to present the sounds to the user 104 to create the impression that they are emanating from a particular location in the physical environment, e.g., using head-related transfer functions (HRTFs).

The above-described assortment of component components 730 are described above in the spirit of illustration, not limitation. Other implementations can use yet other techniques for displaying alert information.

One or more output devices 734 present the alert information generated by the alert composition component 728. For example, the output device(s) 734 can include a display device of any type provided by the VR device 106, such as a liquid crystal display panel, an organic light emitting diode panel (OLED), a digital light projector, etc. Alternatively, or in addition, the output device(s) 734 can include one or more speakers, one or more haptic output devices, etc.

Figure 8:
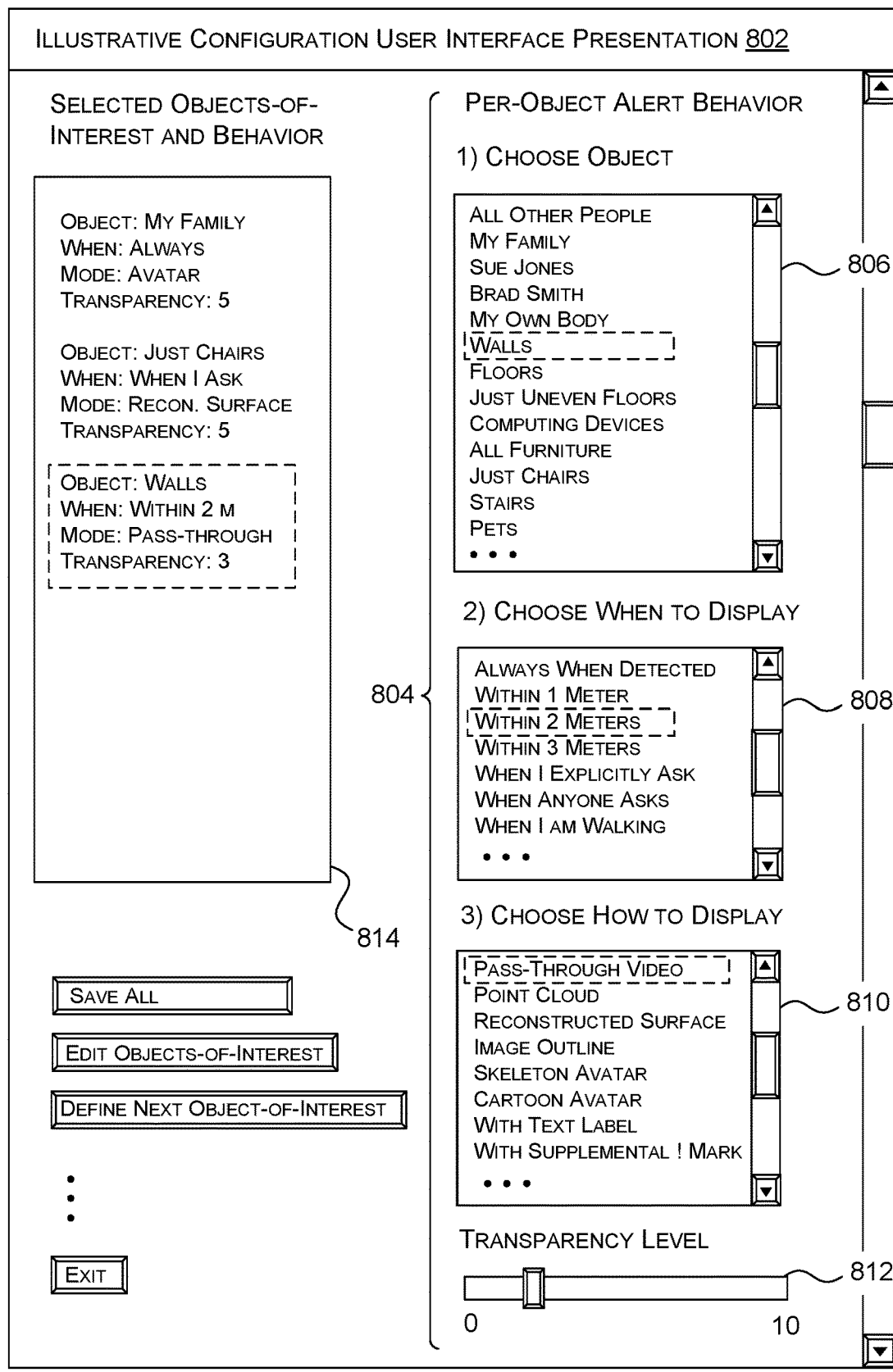
FIG. 8 shows one illustrative implementation of a graphical user interface presentation that can be used to configure the SPC of FIG. 7.

FIG. 8 shows an illustrative graphical UI presentation 802 provided by the configuration component 704. The configuration component 704 solicits input information which governs the SPC's behavior using the graphical UI presentation 802. As stated above, the configuration component 704 can alternatively, or in addition, collect the input information using a speech interface, such as that provided by virtual assistant technology. It will be assumed in the following description that the user 104 supplies the input information prior to interacting with the virtual environment 202. Alternatively, or in addition, the user 104 can supply at least some of the input information in the course of interacting with the virtual environment 202.

In the example of FIG. 8, the configuration component 704 allows the user 104 to specify the detection behavior of the SPC 702 for each individual object-of-interest using graphical controls 804. That is, for example, the configuration component 704 can allow the user 104 to choose one detection behavior for people and another behavior for walls. In another case, the configuration component 704 can allow the user 104 to define the behavior that applies to all objects-of-interest or a subset of objects-of-interest, e.g., by specifying a single instance of behavior that applies to people and walls alike.

In a first control 806, the graphical UI presentation 802 allows the user 104 to specify object-selection information which identifies an object-of-interest. According to the user's current selection, the object-selection information specifies that the object-of-interest corresponds to any wall. More specifically, the first control 806 can allow the user 104 to select an object-of-interest with respect to varying levels of granularity. For example, the first control 806 can allow the user 104 to specify that he is interested in detecting all people in the physical environment 102, or just members of his own family, or just a specific identified person (e.g., "Sue Jones"). The same may apply to other categories of objects. For example, the user 104 may wish to receive alert information for all furniture, or just chairs.

In a second control 808, the graphical UI presentation 802 allows the user 104 to specify alert-condition information. According to the user's current selection, the alert-condition information specifies that the user 104 wishes to be alerted to the presence of walls in the physical environment when the user 104 is within two meters of any wall. Other alert-condition information may depend on a dynamic event in the physical environment 102 (e.g., an action performed by the user 104 or the object-of-interest). Other alert-condition information may depend on a state in the physical environment 102, such on opened or closed state of a door, etc.

In a third control 810, the graphical UI presentation 802 allows the user 104 to specify the format in which the alert information is to be presented to the user 104. According to the user's current selection, the user 104 has selected pass-through video, which will cause the SPC 702 to overlay video information pertaining to the walls onto the virtual environment 202.

According to a fourth control 812, the graphical UI presentation 802 can allow the user 104 to choose the level of transparency of the alert information. Although not shown, the graphical UI presentation 802 can also allow the user 104 to choose other presentation attributes. For example, the user 104 may opt to display a text label or representation of an object in a jitter mode, whereupon it will appear to vibrate back and forth to draw the user's attention to it. Another selectable parameter specifies the amount of time that alert information appears in the virtual environment 202 following the detection of an object-of-interest, etc.

A display field 814 shows the objects-of-interest that the user 104 has chosen thus far, along with their behavioral attributes. The graphical UI presentation 802 provides controls that allow the user 104 to save the user input information, edit previously-supplied user input information, supplement the user input information, etc.

A.3. Illustrative Object Detection Components

The scene analysis component 710 can use an assortment of object detection components to detect the presence of objects-of-interest. For instance, any object detection component can rely on any combination of machine-learned models, including, but not limited to: linear classifier models, Support Vector Machine (SVM) models, Conditional Random Field (CRF) models, deep neural networks of various types (such as Convolutional Neural Network (CNN) models, Recurrent Neural Network (RNN) models, Long Short-Term Memory (LSTM) unit models, etc.), decision tree models, Bayesian network models, Hidden Markov Models (HMMs) (e.g., for detecting of event sequences), rules-based systems, etc., or any combination thereof. The scene analysis component 710 can alternatively, or in addition, rely on any object detection components that do not use machine learning. For example, the scene analysis component 710 can rely on an object detection component which compares ROIs in input image information with a data store of pre-stored pattern templates.

This subsection provides non-limiting examples of object detection components that can be used in the scene analysis component 710. These object detection components should be interpreted in the spirit of illustration, not limitation.

Figure 9:
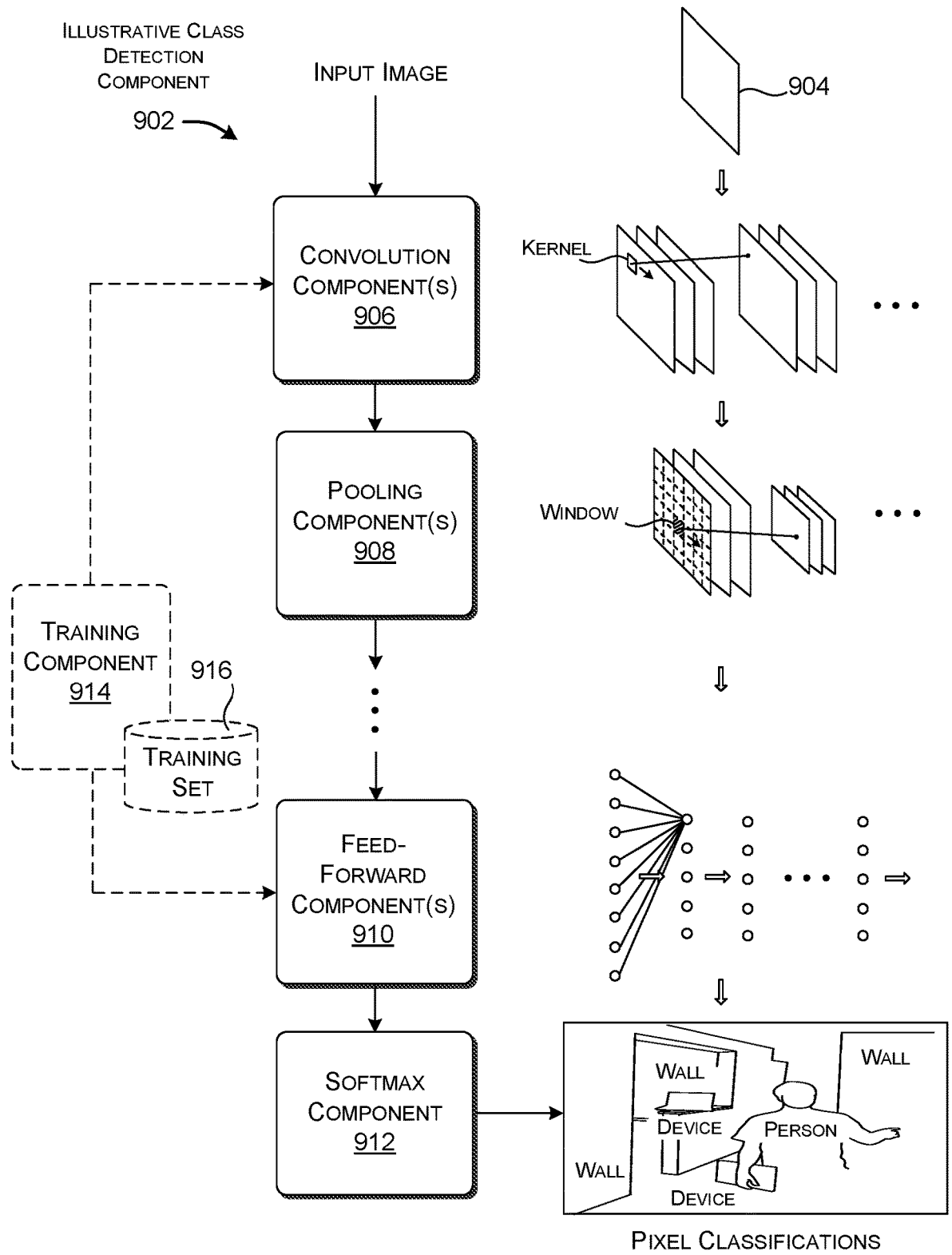
FIG. 9 shows an example of an object detection component that can detect the presence of a set of object classes in the physical environment, for use in the SPC of FIG. 7.

FIG. 9 shows one type of class detection component 902 that can be used to implement one or more of the class detection component(s) 714 of the scene analysis system 710. In this case, the class detection component 902 corresponds to a Convolutional Neural Network (CNN) that performs semantic segmentation. More specifically, the class detection component 902 identifies those parts of an input image 904 that correspond to any of a predetermined set of classes, such as a people class, a wall class, a chair class, a table class, a pet class, a computing device class, and so on. The class detection component 902 performs this task on a pixel-by-pixel basis, e.g., by identifying the most likely class associated with each pixel in the input image 904. In this example, assume that the input image 904 corresponds to a frame of the image information provided by one or more video cameras provided by the VR device 106.

The class detection component 902 performs analysis in a pipeline of stages. One of more convolution components 906 perform a convolution operation on the input image 904. One or more pooling component 908 perform a down-sampling operation. One or more feed-forward components 910 respectively provide one or more fully-connected neural networks, each including any number of layers. More specifically, the class detection component 902 can intersperse the above three kinds of components in any order. For example, the class detection component 902 can include two or more convolution components interleaved with pooling components. A softmax component 912 operates on the output of the preceding layers using a normalized exponential function, to generate final output information.

In each convolution operation, a convolution component moves an n×m kernel across an input image (where "input image" in this general context refers to whatever image is fed to the convolutional component). At each position of the kernel, the convolution component generates the dot product of the kernel values with the underlying pixel values of the image. The convolution component stores that dot product as an output value in an output image at a position corresponding to the current location of the kernel.

More specifically, the convolution component can perform the above-described operation for a set of different kernels having different machine-learned kernel values. Each kernel corresponds to a different pattern. In early stages of processing, a convolutional component may apply a kernel that serves to identify relatively primitive patterns (such as edges, corners, etc.) in the image. In later stages, a convolutional component may apply a kernel that finds more complex shapes (such as shapes that resemble human noses, eyes, keyboards, etc.).

In each pooling operation, a pooling component moves a window of predetermined size across an input image (where the input image corresponds to whatever image is fed to the pooling component). The pooling component then performs some aggregating/summarizing operation with respect to the values of the input image enclosed by the window, such as by identifying and storing the maximum value in the window, generating and storing the average of the values in the window, etc.

A feed-forward component can begin its operation by forming a linear input vector. It can perform this task by concatenating the rows or columns of the input image (or images) that are fed to it, to form a single input vector $z_1$. The feed-forward component then processes the input vector $z_1$ using a feed-forward neural network. Generally, a feed-forward neural network can include N layers of neurons that map the input vector $z_1$ into an output vector y. The values in any layer j may be given by the formula, $z_j = f(W_j z_{j-1} + b_j)$, for j=2, ... N. The symbol $W_j$ denotes a j-th machine-learned weight matrix, and the symbol $b_j$ refers to an optional j-th machine-learned bias vector. The function $f(x)$, referred to as the activation function, can be formulated in different ways, such as the tanh function.

A training component 914 iteratively produces values that govern the operation of at least the convolution component(s) 906 and the feed-forward component(s) 910, and optionally the pooling component(s) 908. These values collectively constitute a machine-trained model. The training component 914 can perform its learning by iteratively operating on a set of training images in a data store 916. For instance, the training images may correspond to images with labels that identify the classification of each pixel in the images. The training component 914 can use any technique to generate the machine-trained model, such as the gradient descent technique.

FIG. 9 shows illustrative output information produced by the class detection component 902. The output information applies labels to the pixels associated with their respective classes, e.g., by identifying those pixels that most likely correspond to people, those pixels that most likely correspond to walls, and those pixels that most likely correspond to computing devices.

An instance detection component can subsequently operate on the output information provided by the class detection component 902 to distinguish among plural instances associated with any class in the output information. In one implementation, such an instance detection component can use one or more CNNs to perform this subsequent segmentation operation.

Figure 10:
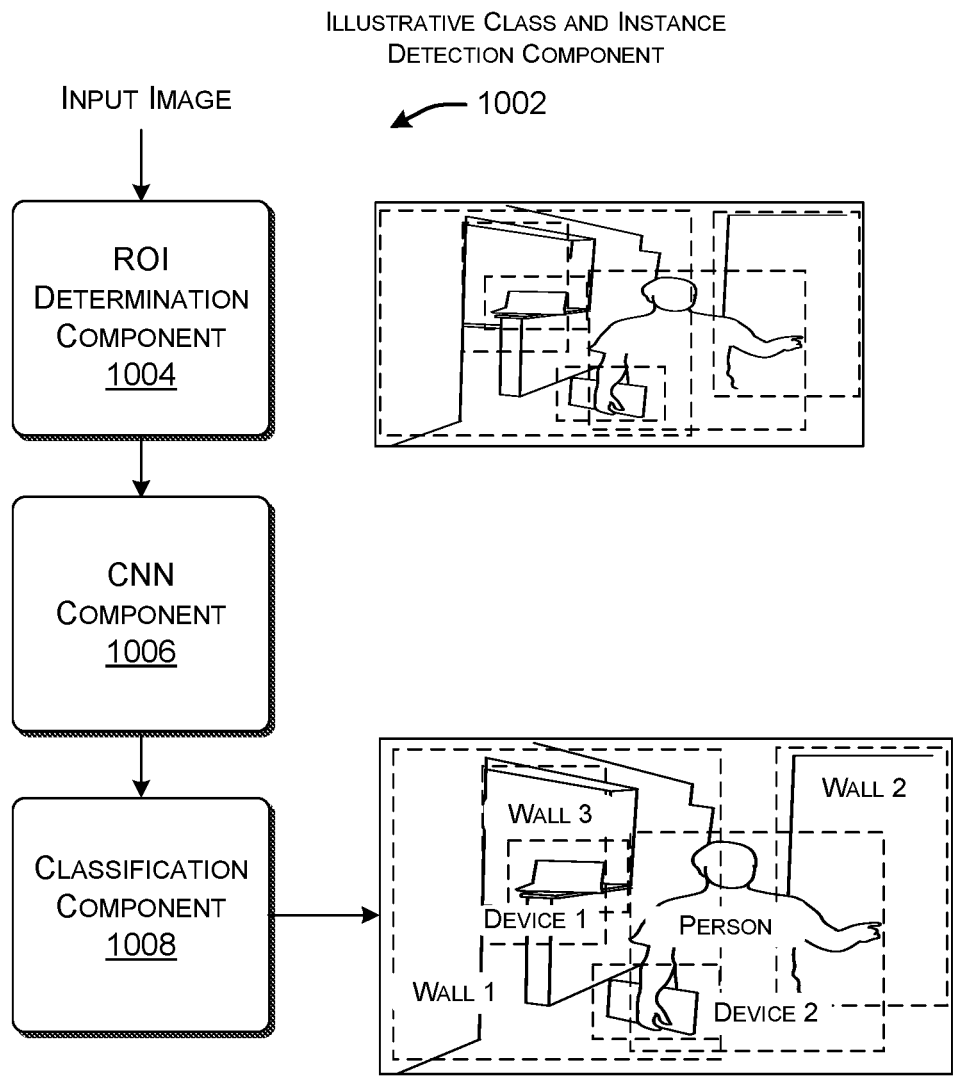
FIG. 10 shows an example of an object detection component that can perform both class segmentation and instance segmentation, for use in the SPC of FIG. 7.

FIG. 10 shows a hybrid detection component 1002 that performs ROI detection, class detection, and instance detection. Again assume that the hybrid detection component 1002 operates on an input image that corresponds to a frame of image information provided by one or more video cameras provided by the VR device 106.

A ROI determination component 1004 identifies bounding boxes (regions of interest, or ROIs) associated with objects in the input image. The ROI determination component 1004 can rely on different techniques to perform this function. In a selective search approach, the ROI determination component 1004 iteratively merges image regions in the input image that meet a prescribed similarity test, initially starting with relatively small image regions. The ROI determination component 1004 can assess similarity based on any combination of features associated with the image regions (such as color, hue, texture, etc., and/or the associated depth image information). Upon the termination of this iterative process, the ROI determination component 1004 draws bounding boxes around the identified regions. In another approach, the ROI determination component 1004 can use a Region Proposal Network (RPN) to generate the ROIs. Background information regarding the Region Proposal Network technique by itself is described in, for instance, Ren, et al., "Faster R-CNN: Towards Real-Time Object Detection with Region Proposal Networks," arXiv: 1506.01497v3 [cs.CV], Jan. 6, 2016.

A CNN component 1006 (as describe above) operates on each ROI identified by the ROI determination component 1004. A classification component 1008 applies any machine-learning model to classify the object associated with each ROI based on the output information provided by the CNN component 1006. For instance, the classification component 1008 can use a deep neural network of any type, a support vector machine model, etc.

Figure 11:
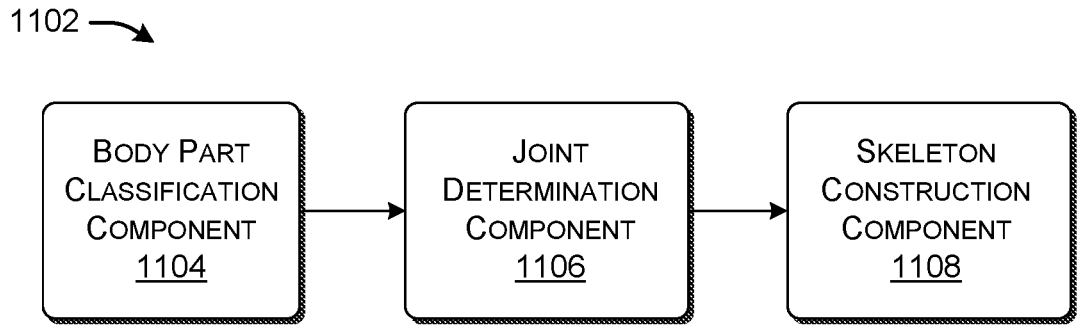
FIG. 11 shows an example of an object detection component that can detect a pose of a human, for use in the SPC of FIG. 7.

FIG. 11 shows one implementation of a pose detection component 1102, corresponding to one example of the pose detection component(s) 722 introduced in FIG. 7. The pose detection component 1102 identifies the pose of a human body that appears in input image information captured by the environment-sensing device(s) 712. The pose detection component 1102 then represents the identified pose using a skeleton of the body. In one implementation, the input image information corresponds to depth image information produced by a depth camera system.

A body part classification component 1104 classifies each pixel of the input image information with respect to its most likely body part. The body part classification component 1104 can perform this task by first generating a set of features associated with each pixel. In one case, the body part classification component 1104 generates the features using the equation:

$$f_\theta(I, x) = d_I\left(x + \frac{u}{d_I(x)}\right) - d_I\left(x + \frac{v}{d_I(x)}\right).$$

The term $d_I(x)$ corresponds to the depth of a pixel x (defined with respect to two dimensions) within an image I. The terms u and v correspond to two pixels having respective offset positions from the pixel x. The above equation gives a feature $f_\theta$ for a particular combination $\theta=(u,v)$. The body part classification component 1104 generates the set of features based on different instantiations of $\theta$.

The body part classification component 1104 can then use a machine-learned model to map the set of features for each pixel into a classification of the pixel. For instance, without limitation, the body part classification component 1104 can use a random forest machine-learned model to perform this task. Or it can use the kind of CNN model shown in FIG. 9, appropriately trained to recognize human body parts. The classification of a pixel indicates the body part to which the pixel most likely belongs.

A joint determination component 1106 determines a representative location associated with each body part. It performs this task based on the per-pixel classifications provided by the body part classification component 1104. A subset of these locations corresponds to skeletal joints, such as elbows, knees, shoulders, etc. Other locations are not necessarily associated with a joint, such as a location associated with "upper torso."

In one non-limiting approach, the joint determination component 1106 uses a clustering technique to identify a representative location within a set of pixels that have been classified as belonging to a same body part. For example, the joint determination component 1106 can use a mean shift technique to perform this task. This approach involves: moving a window to an initial location within an image; determining a center of mass with respect to pixels in the window that have been classified as belonging to a particular body part; moving the window so that its center corresponds to the thus-determined center of mass; and repeating this operation. Eventually, the mean shift technique will move the window to a location at which its center of mass corresponds to the center of the window. This defines the representative location of the body part under consideration.

A skeleton construction component 1108 determines a skeleton based on the locations identified by the joint determination component 1106. The skeleton construction component 1108 can perform this task by linking the joint locations together to create the skeleton. The skeleton construction component 1108 can also consult a stored set of environment-specific rules for assistance in performing this task.

The skeleton generated by the skeleton construction component 1108 specifies the pose of a person at a given point in time. The alert composition component 728 can display the skeleton itself as an avatar. Or the alert composition component 728 can use skeleton as a frame on which to build any other kind of avatar, such as a cartoon-like figure.

The above approach is one of many different skeleton-generating techniques that can be used to generate a skeleton. Additional information regarding the general topic of skeleton generation is provided in: Published U.S. Patent Application No. 20110317871 to Tossell, et al., entitled "Skeletal Joint Recognition and Tracking System," published on Jun. 28, 2012; and Published U.S. Patent Application No. 20110268316 to Bronder, et al., entitled "Multiple Centroid Condensation of Probability Distribution Clouds," published on Nov. 3, 2011. Still other approaches rely on the recursive application of CNNs to identify the location of joints and the connections between the joints.

An optional part-tracking component (not shown) can use any tracking technique to assist in tracking the movement of parts already identified by the pose detection component 1102. For example, the part-tracking technique can use a Kalman filter, a particle filter, etc. in performing this task.

Referring back to FIG. 7, in one implementation, the identity detection component(s) 720 can include at least one face detection component. The face detection component can match image information associated with a person's face with a set of faces known to the face detection component. The face detection component can perform this task using any kind of machine-learned model described above (such as the CNN shown in FIG. 9, support vector machine models, HMMs, etc.). Alternatively, or in addition, the face detection component can use any feature-based technique, principal component analysis technique, linear discriminant analysis technique, the Viola-Jones technique, etc. Other identity detection components can classify other kinds of objects, besides faces. For example, a car detection component can be applied to determine the arrival of a particular make of car.

Another identity detection component can identify a specific person using environment input information other than image information. For example, a voice recognition component can recognize the voice of a specific person. The voice recognition component can use known techniques to perform this task, such as a template-matching algorithm, an HMM model, etc.

Finally, the dynamic event detection component(s) 724 receives environment input information which describes a dynamic event that is occurring in the physical environment 102, such as video information that shows the person 108 performing a gesture, and/or controller input information that describes how the user 104 is currently interacting with one or more controllers. The dynamic event detection component(s) 724 determines whether this environment input information matches telltale information associated with known events. The dynamic event detection component(s) 724 can use known techniques to perform this task, such as a template-matching algorithm, an HMM model, a sequence-detecting RNN, etc.

A.4. Illustrative Virtual Reality Device Incorporating the SPC

Figure 12:
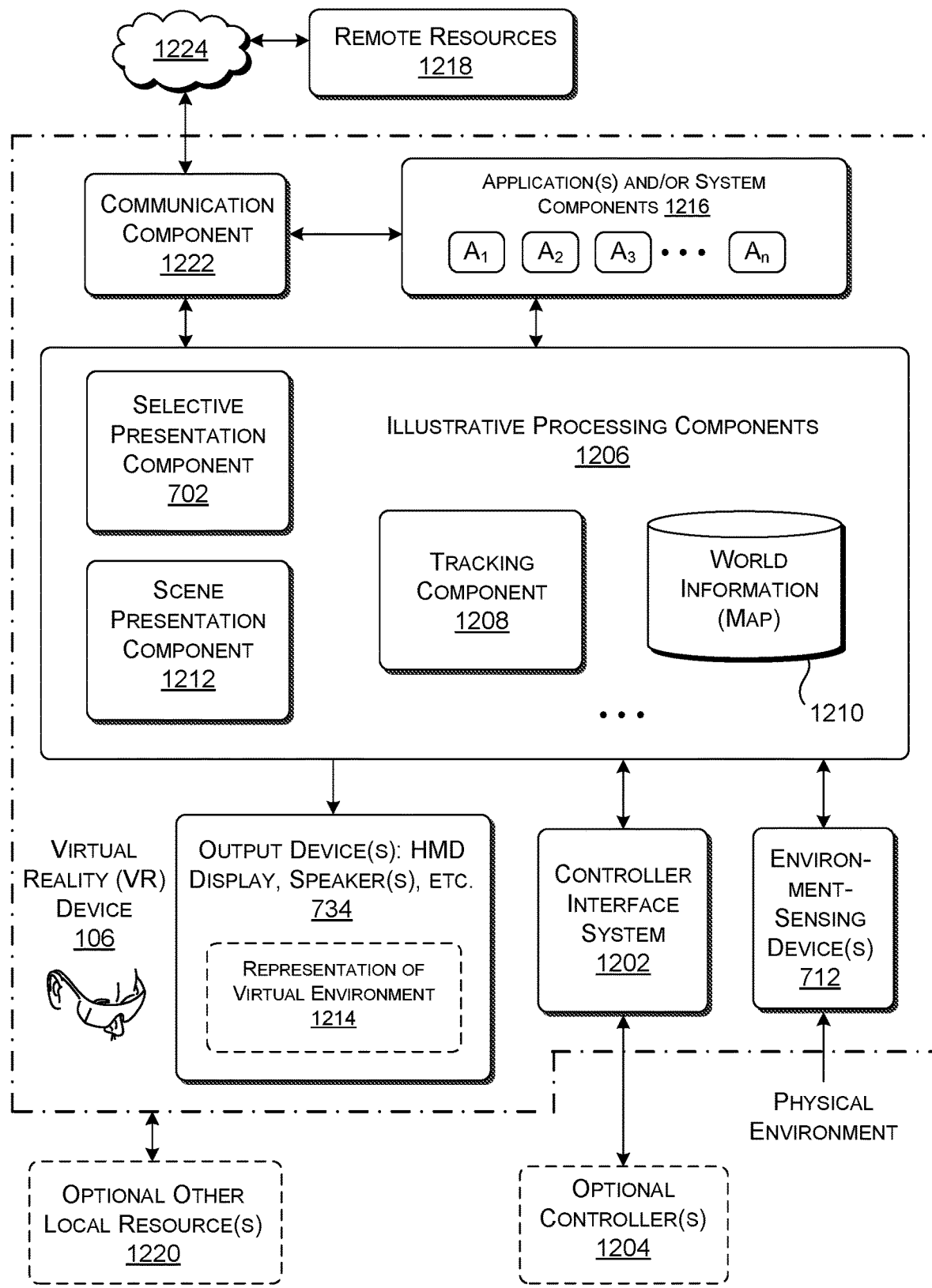
FIG. 12 shows one implementation of a VR device which incorporates the SPC of FIG. 7.

FIG. 12 shows one implementation of the virtual reality (VR) device 106 introduced above. In this case, the VR device 106 corresponds to a head-mounted display (HMD). The VR device 106 includes one or more environment-sensing devices 712 mentioned above for providing environment input information, including, but not limited to: one or more environment-facing video cameras (described above); an environment-facing depth camera system (described above); a gaze-tracking system; an inertial measurement unit (IMU); one or more microphones (and an associated voice recognition system), etc. In one implementation, the IMU can determine the movement of the VR device 106 in six degrees of freedom. The IMU can include one or more accelerometers, one or more gyroscopes, one or more magnetometers, etc., or any combination thereof. The (optional) gaze-tracking system can determine the position of the user's eyes and/or head. The gaze-tracking system can determine the position of the user's eyes, by projecting light onto the user's eyes, and measuring the resultant glints that are reflected from the user's eyes.

An optional controller interface system 1202 handles the user's interaction with one or more controllers 1204. For example, a controller can correspond to a device which the user 104 manipulates with a hand, a body-worn device, etc. The controller interface system 1202 can interact with a controller, for instance, based on electromagnetic radiation and/or magnetic fields emitted by the controller. The controller interface system 1202 can also interact with the controller through a separate local data channel, such as a BLUETOOTH channel, a WIFI channel etc.

A collection of processing components 1206 process the environment input information provided by the environment-sensing devices 712 and/or the controller interface system 1202, to provide a virtual reality experience. For instance, a tracking component 1208 determines the position and orientation of the VR device 106 in the physical environment, with respect to a world coordinate space. In one implementation, the tracking component 1208 can determine the position and orientation of the VR device 106 using Simultaneous Localization and Mapping (SLAM) technology. The SLAM technology progressively builds a map of the physical environment. Further, at each instance, the SLAM technology determines the position and orientation of the VR device 106 with respect to the map in its current state. A data store 1210 stores the map in its current state. Information regarding the general topic of SLAM per se can be found in various sources, such as Durrant-Whyte, et al., "Simultaneous Localization and Mapping (SLAM): Part I The Essential Algorithms," in IEEE Robotics & Automation Magazine, vol. 13, no. 2, June 2006, pp. 99-110, and Bailey, et al., "Simultaneous Localization and Mapping (SLAM): Part II," in IEEE Robotics & Automation Magazine, vol. 13, no. 3, September 2006, pp. 108-117.

The processing components 1206 can also include the selective presentation component (SPC) 702 described above. The SPC 702 can receive environment input information from the environment-sensing device(s) 712. It can also utilize the map provided in the data store 1210.

A scene presentation component 1212 can use graphics pipeline technology to produce a three-dimensional (or two-dimensional) representation of the virtual environment 202. The graphics pipeline technology can perform processing that includes vertex processing, texture processing, object clipping processing, lighting processing, rasterization, etc. Overall, the graphics pipeline technology can represent surfaces in a scene using meshes of connected triangles or other geometric primitives. The scene presentation component 1212 can also produce images for presentation to the left and rights eyes of the user 104, to produce the illusion of depth based on the principle of stereopsis.

One or more output device(s) 734 provide a representation 1214 of the virtual environment 202. As specified above, the output device(s) 734 can include any combination of display devices, such as a liquid crystal display panel, an organic light emitting diode panel (OLED), a digital light projector, etc. The output device(s) 734 may also include one or more speakers. The VR device 106 can use known techniques (e.g., using head-related transfer functions (HRTFs)) to provide directional sound information to the speakers, which the user 104 perceives as originating from a particular location within the physical environment. The output device(s) 734 may also encompass output mechanisms associated with the controller(s) 1204.

The VR device 106 can include a collection of local applications and/or system components 1216, stored in a local data store. Each local application and/or system component can perform any function. For example, a local application may provide a game experience, a simulator experience, etc.

Note that FIG. 12 indicates that the above-described components are housed within a single physical unit associated with the VR device 106. While this represents one viable implementation of the VR device 106, in other cases, any of the functions described above can alternatively, or in addition, be implemented by one or more remote resources 1218 and/or one or more local resources 1220. Similarly, any of the information described above can alternatively, or in addition, be stored by the remote resources 1218 and/or the local resources 1220. The remote resources 1218 may correspond to one or more remote servers and/or other remote processing devices. The local resources 1220 may correspond to one or more processing devices that are located within the same physical environment as the VR device 106. For example, a local processing device may correspond to a device that the user 104 fastens to his or her belt. In view of the above, what is referred to herein as the VR device 106 may encompass processing components distributed over any number of physical processing devices.

A communication component 1222 allows the VR device 106 to interact with the remote resources 1218 via a computer network 1224. The communication component 1222 may correspond to a network card or other suitable communication interface mechanism. The computer network 1224 can correspond to a local area network, a wide area network (e.g., the Internet), one or more point-to-point links, etc., or any combination thereof. The VR device 106 can interact with the optional local resources 1220 through any communication mechanism, such as BLUETOOH, WIFI, a hardwired connection, etc.

Figure 13:
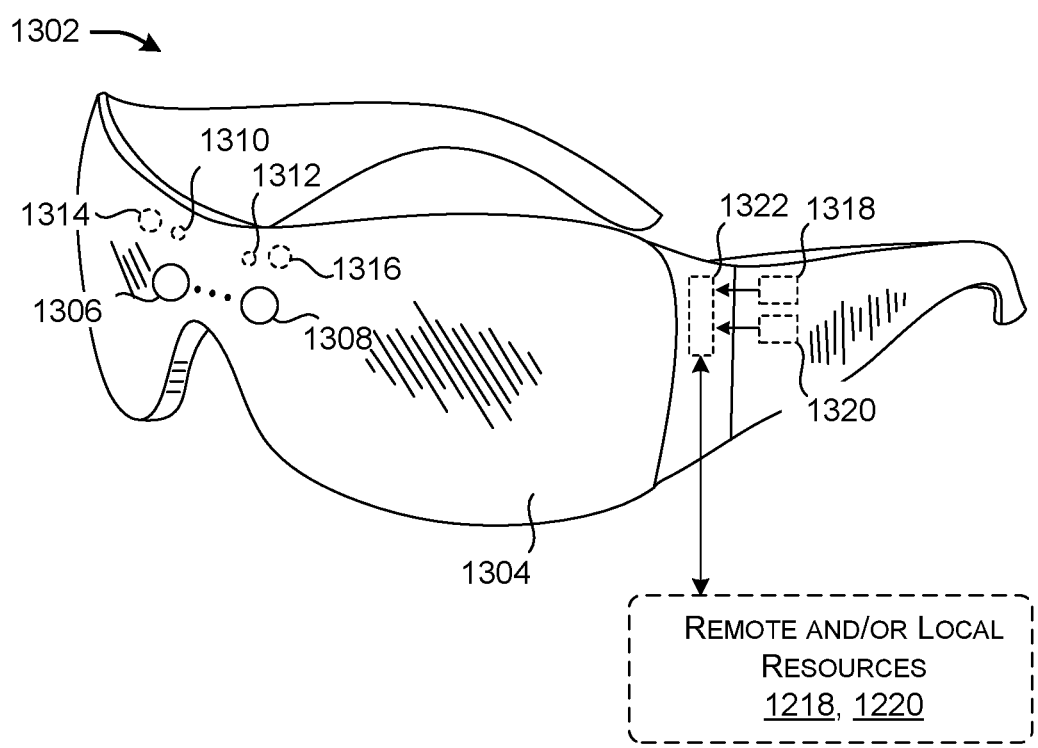
FIG. 13 shows an example of a head-mounted display, corresponding to one kind of VR device that can be used to implement the SPC of FIG. 7.

FIG. 13 shows illustrative and non-limiting structural aspects of a head-mounted display (HMD) 1302, which corresponds to one implementation of the VR device 106 of FIG. 12. The HMD 1302 includes a head-worn frame that houses or otherwise affixes a display device 1304, e.g., corresponding to an opaque (non-see-through) display device or a see-through display device. Waveguides (not shown) or other image information conduits direct left-eye images to the left eye of the user 104 and direct right-eye images to the right eye of the user 104, to overall create the illusion of depth through the effect of stereopsis. Although not shown, the HMD 1302 can also include speakers for delivering sounds to the ears of the user 104.

The HMD 1302 can include any environment-facing imaging components, such as representative environment-facing imaging components 1306 and 1308. The imaging components (1306, 1308) can include RGB cameras, monochrome cameras, a depth camera system (including an illumination source), etc. While FIG. 13 shows only two imaging components (1306, 1308), the HMD 1302 can include any number of such components. The HMD 1302 can optionally include an inward-facing gaze-tracking system. For example, the inward-facing gaze-tracking system can include light sources (1310, 1312) for directing light onto the eyes of the user 104, and cameras (1314, 1316) for detecting the light reflected from the eyes of the user 104.

The HMD 1302 can also include other input mechanisms, such as one or more microphones 1318, an inertial measurement unit (IMU) 1320, etc. As explained above, the IMU 1320 can include one or more accelerometers, one or more gyroscopes, one or more magnetometers, etc., or any combination thereof.

A control engine 1322 can include logic for performing any of the tasks described above, e.g., with reference to FIGS. 7 and 12. The control engine 1322 may optionally interact with the remote resources 1218 via the communication component 1222 (shown in FIG. 12), and/or the local resources 1220.

B. Illustrative Processes

Figure 15:
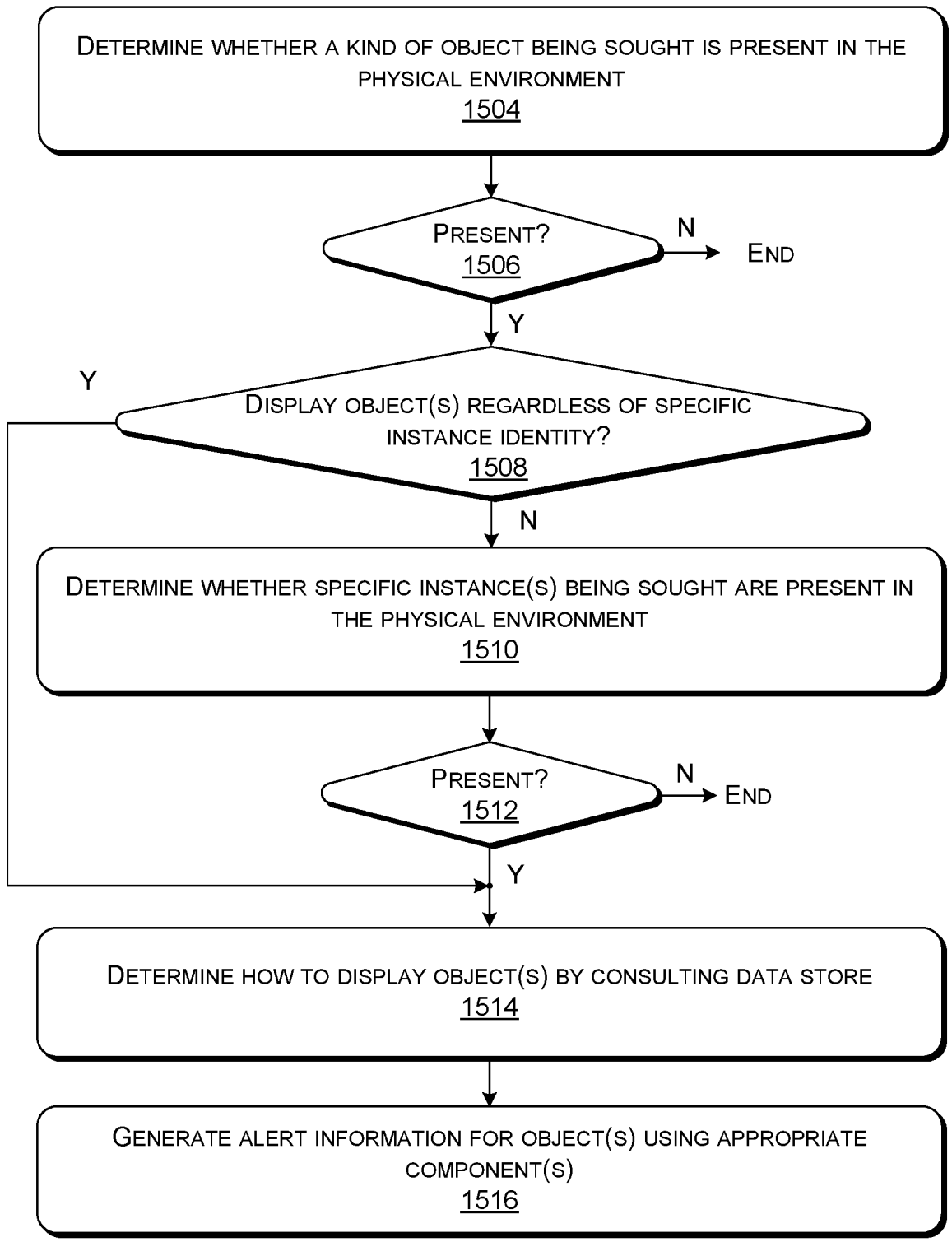
FIG. 15 is a flowchart that shows one example of how the SPC of FIG. 7 can detect an object and present associated alert information.

FIGS. 14 and 15 show processes that explain the operation of the VR device 106 of Section A in flowchart form. Since the principles underlying the operation of the VR device 106 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 14 shows a process 1402 that represents an overview of one manner of operation of the selective presentation component (SPC) 702 of FIG. 7. In block 1404, the SPC 702 receives and stores object-selection information in response to interaction by the user 104 with the input device 706, and/or in response to preconfigured setting information. The object-selection information specifies one or more objects-of-interest; these objects-of-interest, in turn, correspond to a subset of objects within a master set of selectable objects. In block 1406, the SPC 702 receives environment input information that represents a physical environment 102 from at least one environment-sensing device 712. The physical environment 102 corresponds to a physical setting in which the user 104 uses the VR device 106 to interact with the virtual environment 202. In block 1408, the SPC 702 analyzes the environment input information using the scene analysis component 710 to determine whether any of the objects-of-interest are present in the physical environment 102 at a current time. The analyzing operation produces, upon an affirmative determination result, output information which identifies at least one detected object. In block 1410, the SPC 702 generates alert information that identifies the presence of the detected object(s). In block 1412, the SPC 702 presents the alert information to the output device(s) 734 of the VR device 106 (which encompasses output mechanisms associated with the controller(s) 1204, etc.) while the user 104 interacts with the virtual environment 202 provided by the VR device 106.

Block 1406 (which collects object-selection information) can be expanded to encompass additional data collection operations. For instance, the SPC 702 can also receive alert-condition information which specifies at least one condition in which the alert information is to be provided to the user 104. The SPC 702 can also receive alert-mode information that specifies a manner in which the alert information is to be presented to the user 104 via the output device 734 of the VR device 106.

FIG. 15 shows a process 1502 that describes one non-limiting way of invoking various components of the SPC 702 in the course of determining whether a specified object-of-interest is present in the physical environment 102. Note that FIG. 15 is explained in the context of a single object-of-interest, but the SPC 702 can duplicate the analysis of the process 1502 for additional specified objects-of-interest. In block 1504, the SPC 702 may determine whether a kind of object-of-interest being sought is present in the physical environment 102, e.g., using the class detection component(s) 714. If not (as determined in block 1506), then the SPC 702 terminates the process 1502 with respect to the class under consideration. If, however, the specified kind of object is present, then, in block 1508, the SPC 702 determines whether it is appropriate to display the object(s) regardless of the identities of their respective instance(s). For example, the user 104 may have instructed the SPC 702 to provide alert information upon the discovery of any people in the physical environment 102, without regard to whom these people may be. If this is so, then the SPC 702 will generate alert information for the detected object(s) (in a manner described below) without resolving the identity (ies) of those object(s).

If block 1508 is answered in the negative, then, in block 1510, the SPC 702 can invoke the appropriate object detection component(s) to determine whether the specific instance (or instances) that is (or are) being sought (such as a specific person) is (or are) present in the physical environment 102. The SPC 702 can perform this task in various ways, such as by using the identity detection component(s) 720. If the SPC 702 determines that at least one specific instance being sought is present in the physical environment 102 (per block 1512), then the SPC 702 commences to display the object(s), per block 1514. But if block 1512, is answered in the negative, then the SPC 702 will terminate the process 1502.

In block 1514, the SPC 702 consults the data store 708 to determine how it should present alert information for the detected object(s)-of-interest. In block 1516, the SPC 702 generates alert information for the detected object(s) in the manner requested. This operation may entail various kinds of processing, depending on the user's previous selection of alert-mode information. The processing can include any of: instance detection performed by the instance detection component(s) 718, pose detection performed by the pose detection component(s) 722, surface reconstruction, edge emphasis, avatar generation, etc.

Consider a specific example. The user 104 may work with a team of colleagues in an office space. The user 104 may wish to be alerted to the presence of a specific colleague with whom the user 104 is planning to have lunch. But the user 104 may not wish to receive alert information for other colleagues in his work space. Accordingly, the user 104 will configure the SPC 702 such that it detects only the desired colleague. In use, the SPC 702 will determine when the designated colleague has moved within a specified proximity to the user 104, and alert the user 104 to that person's presence. By virtue of this manner of operation, the user 104 will receive the alert information he desires without otherwise cluttering the virtual environment 202 with extraneous information, such as alert information that identifies the presence of other people. The SPC 702 can detect the appearance of a specific person by first determining whether a person has appeared within the physical environment (e.g., using the class detection component(s) 714), and then determining the identity of that person (e.g., using the identity detection component(s) 720).

C. Representative Computing Functionality

Figure 16:
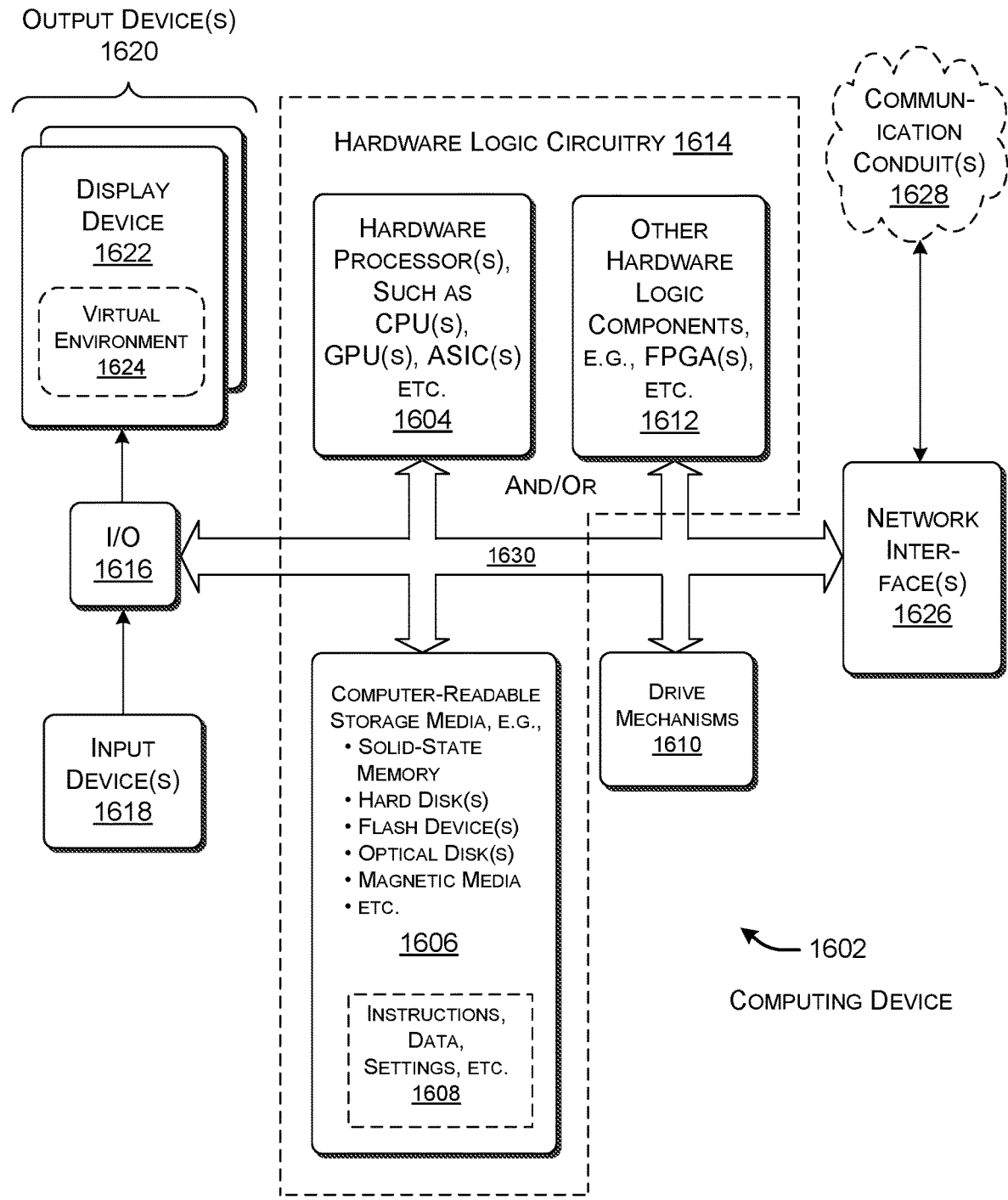
FIG. 16 shows an illustrative type of a computing device that can be used to implement any aspect of the features shown in the foregoing drawings.

FIG. 16 shows a computing device 1602 that can be used to implement any aspect of the mechanisms set forth in the above-described figures. For instance, the type of computing device 1602 shown in FIG. 16 can be used to implement the processing aspects of the VR device 106 shown in FIG. 12, or, more specifically, the head-mounted display 1302 of FIG. 13. In all cases, the computing device 1602 represents a physical and tangible processing mechanism.

The computing device 1602 can include one or more hardware processors 1604. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processing unit.

The computing device 1602 can also include computer-readable storage media 1606, corresponding to one or more computer-readable media hardware units. The computer-readable storage media 1606 retains any kind of information 1608, such as machine-readable instructions, settings, data, etc. Without limitation, for instance, the computer-readable storage media 1606 may include one or more solid-state devices, one or more magnetic hard disks, one or more optical disks, magnetic tape, and so on. Any instance of the computer-readable storage media 1606 can use any technology for storing and retrieving information. Further, any instance of the computer-readable storage media 1606 may represent a fixed or removable component of the computing device 1602. Further, any instance of the computer-readable storage media 1606 may provide volatile or non-volatile retention of information.

The computing device 1602 can utilize any instance of the computer-readable storage media 1606 in different ways. For example, any instance of the computer-readable storage media 1606 may represent a hardware memory unit (such as Random Access Memory (RAM)) for storing transient information during execution of a program by the computing device 1602, and/or a hardware storage unit (such as a hard disk) for retaining/archiving information on a more permanent basis. In the latter case, the computing device 1602 may also include one or more drive mechanisms 1610 (such as a hard drive mechanism) for storing and retrieving information from an instance of the computer-readable storage media 1606.

The computing device 1602 may perform any of the functions described above when the hardware processor(s) 1604 carry out computer-readable instructions stored in any instance of the computer-readable storage media 1606. For instance, the computing device 1602 may carry out computer-readable instructions to perform each block of the processes described in Section B.

Alternatively, or in addition, the computing device 1602 may rely on one or more other hardware logic components 1612 to perform operations using a task-specific collection of logic gates. For instance, the hardware logic component(s) 1612 may include a fixed configuration of hardware logic gates, e.g., that are created and set at the time of manufacture, and thereafter unalterable. Alternatively, or in addition, the other hardware logic component(s) 1612 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 16 generally indicates that hardware logic circuitry 1614 corresponds to any combination of the hardware processor(s) 1604, the computer-readable storage media 1606, and/or the other hardware logic component(s) 1612. That is, the computing device 1602 can employ any combination of the hardware processor(s) 1604 that execute machine-readable instructions provided in the computer-readable storage media 1606, and/or one or more other hardware logic component(s) 1612 that perform operations using a fixed and/or programmable collection of hardware logic gates.

The computing device 1602 also includes an input/output interface 1616 for receiving various inputs (via input devices 1618), and for providing various outputs (via output devices 1620). Illustrative input devices 1618 and output devices 1620 were described above in connection with FIGS. 12 and 13. One particular output mechanism may include a display device 1622 that provides a virtual environment 1624. The computing device 1602 can also include one or more network interfaces 1626 for exchanging data with other devices via one or more communication conduits 1628. One or more communication buses 1630 communicatively couple the above-described components together.

The communication conduit(s) 1628 can be implemented in any manner, e.g., by a local area computer network, a wide area computer network (e.g., the Internet), point-to-point connections, etc., or any combination thereof. The communication conduit(s) 1628 can include any combination of hardwired links, wireless links, routers, gateway functionality, name servers, etc., governed by any protocol or combination of protocols.

FIG. 16 shows the computing device 1602 as being composed of a discrete collection of separate units. In some cases, the collection of units may correspond to discrete hardware units provided in a computing device chassis or frame having any form factor. In other cases, the computing device 1602 can include a hardware logic component that integrates the functions of two or more of the units shown in FIG. 1. For instance, the computing device 1602 can include a system on a chip (SoC or SOC), corresponding to an integrated circuit that combines the functions of two or more of the units shown in FIG. 16.

The following summary provides a non-exhaustive set of illustrative aspects of the technology set forth herein.

According to a first aspect, one or more computing devices for presenting information to a user about a physical environment are described. The computing device(s) include a hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The operations include: receiving object-selection information, in response to interaction by the user with an input device, and/or in response to preconfigured setting information, the object-selection information specifying one or more objects-of-interest, the one or more objects-of-interest corresponding to a subset of objects within a master set of selectable objects; receiving environment input information that represents the physical environment from at least one environment-sensing device, the physical environment corresponding to a physical setting in which the user uses a virtual reality device to interact with a virtual environment; analyzing the environment input information using a scene analysis component to determine whether any of the one or more objects-of-interest are present in the physical environment at a current time, the analyzing producing, upon an affirmative determination result, output information which identifies at least one detected object; generating alert information that identifies presence of the at least one detected object; and presenting the alert information to an output device of the virtual reality device while the user interacts with the virtual environment provided by the virtual reality device.

According to a second aspect, the object-selection information specifies a general class of objects.

According to a third aspect, the object-selection information specifies a specific instance of an identified class of objects.

According to a fourth aspect, the object-selection information specifies at least one specific person, distinguished from among a general class of people.

According to a fifth aspect, the operations further include receiving alert-condition information which specifies at least one condition in which the alert information is to be provided to the user.

According to a sixth aspect, the alert-condition information specifies that alert information is to be provided to the user when the user is within a prescribed distance to an object-of-interest in the physical environment.

According to a seventh aspect, the alert-condition information specifies that alert information is to be provided to the user only upon receiving a command from the user to do so while the user is interacting with the virtual environment.

According to an eighth aspect, the alert-condition information specifies that alert information is to be provided to the user only when: the user is performing a prescribed action and/or when the user exhibits a prescribed state; and/or an object-of-interest performs a prescribed action and/or when an object-of-interest exhibits a prescribed state.

According to a ninth aspect, dependent on the eighth aspect, the prescribed action and/or the prescribed state exhibited by the user pertains to a manner in which the user is currently using at least one controller to interact with the virtual environment.

According to a tenth aspect, the operations further include receiving alert-mode information that specifies a manner in which the alert information is to be presented to the user via the output device of the virtual reality device.

According to an eleventh aspect, the alert-mode information specifies that video information that captures a detected object is to be overlaid on the virtual environment.

According to a twelfth aspect, the alert-mode information specifies that proxy virtual content associated with a detected object is to be overlaid on the virtual environment as a replacement and/or a supplement to a direct representation of a detected object.

According to a thirteenth aspect, dependent on the twelfth aspect, the proxy virtual content is an avatar that duplicates a detected pose of a human being in the physical environment.

According to a fourteenth aspect, the alert-mode information specifies that a point cloud or reconstructed three-dimensional surface associated with a detected object is to be overlaid on the virtual environment.

According to a fifteenth aspect, the scene analysis component uses one or more machine-trained object detection components to detect the one or more objects-of-interest.

According to a sixteenth aspect, the scene analysis component includes one or more of: a class detection component that detects presence of at least one class of objects in the physical environment; and/or an instance detection component which identifies presence of at least one instance of at least one class of objects in the physical environment; and/or an identity detection component which detects presence of a particular instance of a class of objects in the physical environment.

According to a seventeenth aspect, a method is described for presenting information to a user about a physical environment. The method includes: receiving object-selection information, in response to interaction by the user with an input device, and/or in response to preconfigured setting information, the object-selection information specifying one or more objects-of-interest; receiving alert-mode information, in response to interaction by the user with the input device, and/or in response to preconfigured setting information, that specifies a manner in which the user is to be notified of presence of the one or more objects-of-interest in the physical environment; receiving environment input information that represents the physical environment from at least one environment-sensing device, the at least one environment-sensing device being provided by a virtual reality device, the physical environment corresponding to a physical setting in which the user uses the virtual reality device to interact with a virtual environment; analyzing the environment input information using a scene analysis component to determine whether any of the one or more objects-of-interest are present in the physical environment at a current time, the analyzing producing, upon an affirmative determination result, output information which identifies at least one detected object; generating alert information, in a manner specified by the alert-mode information, that identifies presence of the at least one detected object; and presenting the alert information to an output device of the virtual reality device while the user interacts with the virtual environment provided by the virtual reality device. The alert information apprises the user of a subset of objects in the physical environment at the current time, but not all of the objects in the physical environment that can be selected.

According to an eighteenth aspect, dependent on the seventeenth aspect, the scene analysis component uses one or more machine-trained object detection components to detect the one or more objects-of-interest.

According to a nineteenth aspect, a computer-readable storage medium is described for storing computer-readable instructions. The computer-readable instructions, when executed by one or more hardware processors, perform a method that includes: receiving object-selection information, in response to interaction by the user with an input device, and/or in response to preconfigured setting information, the object-selection information specifying one or more objects-of-interest, the one or more objects-of-interest corresponding to a subset of objects within a master set of selectable objects; receiving environment input information that represents the physical environment from at least one environment-sensing device, the physical environment corresponding to a physical setting in which the user uses a virtual reality device to interact with a virtual environment; analyzing the environment input information using a scene analysis component to determine whether any of the one or more objects-of-interest are present in the physical environment at a current time, the analyzing producing, upon an affirmative determination result, output information which identifies at least one detected object; generating alert information that identifies presence of the at least one detected object; and presenting the alert information to an output device of the virtual reality device while the user interacts with the virtual environment provided by the virtual reality device. The scene analysis component uses one or more machine-trained object detection components to detect the one or more objects-of-interest.

According to a twentieth aspect, dependent on the nineteenth aspect, the method further includes receiving alert-mode information that specifies a manner in which the alert information is to be presented to the user via the output device of the virtual reality device.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for presenting information to a user about a physical environment, comprising:
   hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
   receiving object-selection information in response to interaction by the user with an input device, and/or in response to preconfigured setting information, the object-selection information specifying one or more objects-of-interest, said one or more objects-of-interest corresponding to a subset of objects within a set of selectable objects;
   receiving environment input information that represents the physical environment from at least one environment-sensing device, the physical environment corresponding to a physical setting in which the user uses a virtual reality device to interact with a virtual environment;
   analyzing the environment input information using a scene analysis component to determine whether any of said one or more objects-of-interest are present in the physical environment at a current time, said analyzing producing, upon an affirmative determination result, output information which identifies at least one detected object;
   generating alert information that identifies presence of said at least one detected object; and
   presenting the alert information to an output device while the user interacts with the virtual environment provided by the virtual reality device,
   the operations further comprising receiving alert-condition information that specifies at least one condition in which the alert information is to be provided to the user,
   wherein the alert-condition information specifies that alert information is to be provided to the user when the user is performing a prescribed action and/or when the user exhibits a prescribed state,
   wherein the prescribed action and/or the prescribed state pertains to a manner in which the user is currently physically manipulating at least one controller in a course of interacting with an immersive virtual scenario, in relation to one or more physical objects in the physical environment.

2. The one or more computing devices of claim 1, wherein the operations further comprise receiving alert-mode information that specifies a manner in which the alert information is to be presented to the user via the output device, said receiving of alert-mode information comprising receiving a selection by the user of a presentation technique for each individual object-of-interest of said one or more objects-of-interest, selected from a set of selectable presentation techniques presented by a user interface presentation.

3. The one or more computing devices of claim 2, wherein one selectable presentation technique specifies that video information that captures a detected object is to be overlaid on the virtual environment.

4. The one or more computing devices of claim 2, wherein one selectable presentation technique specifies that proxy virtual content associated with a detected object is to be overlaid on the virtual environment as a replacement and/or a supplement to a direct representation of the detected object.

5. The one or more computing devices of claim 4, wherein the proxy virtual content is an avatar that duplicates a detected pose of a human being in the physical environment.

6. The one or more computing devices of claim 2, wherein one selectable presentation technique specifies that a point cloud or reconstructed three-dimensional surface associated with a detected object is to be overlaid on the virtual environment.

7. The one or more computing devices of claim 1, wherein the scene analysis component uses one or more machine-trained object detection components to detect said one or more objects-of-interest, the scene analysis component operating, for at least one particular object-of-interest, by using said one or more machine-trained models to:

determine whether a class of object associated with the particular object-of-interest is present in the physical environment; and if the class of object is present, determine whether a specific instance associated with the particular object-of-interest is present in the physical environment.

8. The one or more computing devices of claim 1, wherein the alert-condition information specifies that the alert information is to be provided depending on a type of said at least one controller that the user is currently handling.

9. The one or more computing devices of claim 1, wherein the alert-condition information specifies that the alert information is to be provided depending on a current position and/or orientation of said at least one controller in the physical environment.

10. The one or more computing devices of claim 1, wherein the alert-condition information specifies that the alert information is to be provided depending on a current movement of said at least one controller.

11. The one or more computing devices of claim 1, wherein the alert-condition information specifies that the alert information is to be provided depending on a proximity of said at least one controller to at least one physical object in the physical environment.

12. The one or more computing devices of claim 1, wherein the alert-condition information specifies that the alert information is to be provided depending on a kind of virtual environment with which the user is currently interacting using said at least one controller.

13. The one or more computing devices of claim 1, wherein the output device to which the alert information is presented is located on said at least one controller.

14. A method for presenting information to a user about a physical environment, the physical environment corresponding to a physical setting in which the user uses a virtual reality device to interact with a virtual environment, the method comprising:

receiving object-selection information in response to interaction by the user with a user interface presentation via an input device, the object-selection information specifying one or more objects-of-interest, said receiving of object-selection information comprising receiving a selection by the user of each object-of-interest from a set of selectable objects-of-interest presented by the user interface presentation;

receiving alert-mode information in response to interaction by the user with the user interface presentation via the input device, the alert-mode information specifying a manner in which the user is to be notified of presence of said one or more objects-of-interest in the physical environment, said receiving of alert-mode information comprising receiving a selection by the user of a presentation technique for each individual object-of-interest, selected from a set of selectable presentation techniques presented by the user interface presentation;

receiving environment input information that represents the physical environment from at least one environment-sensing device, said at least one environment-sensing device being provided by the virtual reality device;

analyzing the environment input information using a scene analysis component to determine whether any of said one or more objects-of-interest are present in the physical environment at a current time, said analyzing producing, upon an affirmative determination result, output information which identifies at least one detected object;

generating alert information for each individual detected object, in a manner specified by the alert-mode information for the individual detected object, that identifies presence of the individual detected object; and presenting the alert information to an output device while the user interacts with the virtual environment provided by the virtual reality device, the alert information apprising the user of a subset of objects in the physical environment at the current time, but not all of the objects in the physical environment that can be selected.

15. The method of claim 14, wherein the scene analysis component uses one or more machine-trained object detection components to detect said one or more objects-of-interest.

16. The method of claim 14, wherein the selectable presentation techniques include:

a first selectable presentation technique that specifies that video information that captures a particular detected object is to be overlaid on the virtual environment;

a second selectable presentation technique that specifies that proxy virtual content associated with the particular detected object is to be overlaid on the virtual environment as a replacement and/or a supplement to a direct representation of the detected object;

a third selectable presentation technique that specifies that a point cloud associated with the particular detected object is to be overlaid on the virtual environment, the point cloud including points provided by a depth camera; and a fourth selectable presentation technique that specifies that a reconstructed three-dimensional surface associated with the particular detected object is to be overlaid on the virtual environment.

17. The method of claim 14, wherein one selectable presentation technique specifies that virtual content is to be added to an otherwise direct representation of a particular detected object.

18. The method of claim 14, further comprising receiving alert-condition information that specifies at least one condition in which the alert information is to be provided to the user,
   wherein the alert-condition information specifies that alert information is to be provided to the user when the user performs a prescribed action and/or when the user exhibits a prescribed state,
   wherein the prescribed action and/or the prescribed state pertains to a manner in which the user is currently physically manipulating at least one controller in a course of interacting with an immersive virtual scenario, in relation to one or more physical objects in the physical environment.

19. A computer-readable storage medium for storing computer-readable instructions, the computer-readable instructions, when executed by one or more hardware processors, performing a method that comprises:
   receiving object-selection information in response to interaction by the user with an input device, the object-selection information specifying one or more objects-of-interest, said one or more objects-of-interest corresponding to a subset of objects within a set of selectable objects;
   receiving environment input information that represents a physical environment from at least one environment-sensing device, the physical environment corresponding to a physical setting in which the user uses a virtual reality device to interact with a virtual environment;
   analyzing the environment input information using a scene analysis component to determine whether any of said one or more objects-of-interest are present in the physical environment at a current time, said analyzing producing, upon an affirmative determination result, output information which identifies at least one detected object,
   the scene analysis component using one or more machine-trained object detection components to detect said one or more objects-of-interest;
   generating alert information that identifies presence of said at least one detected object; and
   presenting the alert information to an output device of the virtual reality device while the user interacts with the virtual environment provided by the virtual reality device,
   wherein the method further comprises receiving alert-mode information that specifies a manner in which the alert information is to be presented to the user via the output device,
   said receiving of alert-mode information comprising receiving a selection by the user of a presentation technique for each individual object-of-interest, selected from a set of selectable presentation techniques presented by a user interface presentation.

20. A computer-readable storage medium for storing computer-readable instructions, the computer-readable instructions, when executed by one or more hardware processors, performing a method that comprises:
   receiving object-selection information in response to interaction by the user with an input device, the object-selection information specifying one or more objects-of-interest, said one or more objects-of-interest corresponding to a subset of objects within a set of selectable objects;
   receiving environment input information that represents a physical environment from at least one environment-sensing device, the physical environment corresponding to a physical setting in which the user uses a virtual reality device to interact with a virtual environment;
   analyzing the environment input information using a scene analysis component to determine whether any of said one or more objects-of-interest are present in the physical environment at a current time, said analyzing producing, upon an affirmative determination result, output information which identifies at least one detected object,
   the scene analysis component using one or more machine-trained object detection components to detect said one or more objects-of-interest;
   generating alert information that identifies presence of said at least one detected object; and
   presenting the alert information to an output device of the virtual reality device while the user interacts with the virtual environment provided by the virtual reality device,
   wherein the method further comprises receiving alert-condition information that specifies at least one condition in which the alert information is to be provided to the user,
   wherein the alert-condition information specifies that alert information is to be provided to the user when the user performs a prescribed action and/or when the user exhibits a prescribed state,
   wherein the prescribed action and/or the prescribed state pertains to a manner in which the user is currently physically manipulating at least one controller in a course of interacting with an immersive virtual scenario, in relation to one or more physical objects in the physical environment.

* * * * *